US010152857B2

(12) United States Patent
Harpole

(10) Patent No.: US 10,152,857 B2
(45) Date of Patent: *Dec. 11, 2018

(54) CONFIGURABLE MOTION DETECTION AND ALERTS FOR AUDIO/VIDEO RECORDING AND COMMUNICATION DEVICES

(71) Applicant: Ring LLC, Santa Monica, CA (US)

(72) Inventor: Aaron Harpole, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,001

(22) Filed: Jun. 7, 2017

(65) Prior Publication Data
US 2017/0358186 A1 Dec. 14, 2017

Related U.S. Application Data

(60) Provisional application No. 62/350,057, filed on Jun. 14, 2016.

(51) Int. Cl.
*G08B 13/196* (2006.01)

(52) U.S. Cl.
CPC . *G08B 13/19606* (2013.01); *G08B 13/19615* (2013.01); *G08B 13/19652* (2013.01); *G08B 13/19682* (2013.01); *G08B 13/19697* (2013.01)

(58) Field of Classification Search
CPC .... H04N 7/181; G06F 3/0484; G06F 17/2705
See application file for complete search history.

(56) References Cited

U.S. PATENT DOCUMENTS

| 4,764,953 | A | | 8/1988 | Chern et al. |
|---|---|---|---|---|
| 5,276,427 | A | * | 1/1994 | Peterson ............ G08B 13/2494 340/506 |
| 5,428,388 | A | | 6/1995 | von Bauer et al. |
| 5,760,848 | A | | 6/1998 | Cho |
| 6,072,402 | A | | 6/2000 | Kniffin et al. |
| 6,192,257 | B1 | | 2/2001 | Ray |
| 6,271,752 | B1 | | 8/2001 | Vaios |

(Continued)

FOREIGN PATENT DOCUMENTS

| CN | 2585521 Y | 11/2003 |
|---|---|---|
| CN | 2792061 Y | 6/2006 |

(Continued)

*Primary Examiner* — Maria El-Zoobi
(74) *Attorney, Agent, or Firm* — Chong IP Law, LLP

(57) ABSTRACT

Some embodiments provide a method for separating the motion detection zone(s) of an A/V recording and communication device from the motion alert zone(s) of the A/V recording and communication device. For example, an A/V recording and communication device may be configured to generate motion alerts, and to record audio and video footage, when an event is detected within a selected motion alert zone (e.g., within a defined radius around the A/V recording and communication device). However, the A/V recording and communication device may not generate a motion alert for an event detected outside of the selected motion alert zone, even though the device may still record audio and video footage for the detected event (e.g., when the event is within a selected motion detection zone).

22 Claims, 37 Drawing Sheets

(56) References Cited

U.S. PATENT DOCUMENTS

| | | |
|---|---|---|
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2007/0036456 A1* | 2/2007 | Hooper .................... G06T 5/20 382/274 |
| 2009/0042604 A1* | 2/2009 | Ficquette ......... G08B 13/19658 455/556.1 |
| 2009/0262206 A1* | 10/2009 | Park ................ G08B 13/19641 348/218.1 |
| 2009/0307255 A1* | 12/2009 | Park ...................... G06Q 10/10 |
| 2010/0195810 A1* | 8/2010 | Mota ...................... H04N 7/186 379/167.12 |
| 2010/0225455 A1 | 9/2010 | Claiborne et al. |
| 2013/0017812 A1* | 1/2013 | Foster ................ H04L 12/2825 455/417 |
| 2013/0057695 A1 | 3/2013 | Huisking |
| 2013/0335219 A1* | 12/2013 | Malkowski ............ G08B 13/22 340/539.22 |
| 2014/0267716 A1 | 9/2014 | Child et al. |
| 2015/0163463 A1 | 6/2015 | Hwang et al. |
| 2016/0283074 A1* | 9/2016 | Drive ................ G08B 13/19693 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

CONFIGURABLE MOTION DETECTION AND ALERTS FOR AUDIO/VIDEO RECORDING AND COMMUNICATION DEVICES

CROSS-REFERENCE TO RELATED APPLICATION

This application claims the benefit of provisional application Ser. No. 62/350,057, filed on Jun. 14, 2016, the entire contents of which are hereby incorporated by reference.

TECHNICAL FIELD

The present embodiments relate to audio/video (A/V) recording and communication devices, including A/V recording and communication doorbells and A/V recording and communication security cameras. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells and security cameras, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present configurable motion detection and alerts for audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that users of A/V recording and communication devices do not necessarily want to receive an alert every time their devices detect motion and record footage. For example, a given A/V recording and communication device may be located in a high-traffic area, such as at the entrance to a home located on a busy street. Passing cars may from time to time trigger motion detection from the A/V recording and communication device. If the user receives an alert for every one of these events, the user may soon suffer from alert fatigue, which may cause the user to disable the motion detection function for his or her A/V recording and communication device. That device will thus not be able to record any audio and video footage in response to detecting motion, which may result in the device losing some of its value in identifying, apprehending, and prosecuting criminal perpetrators. It would be advantageous, therefore, if the user could configure the A/V recording and communication device such that it can detect motion and record audio and video footage without generating an excessive amount of motion alerts.

The present embodiments solve this problem by separating the motion detection zone(s) of an A/V recording and communication device from the motion alert zone(s) of the A/V recording and communication device. That is, some of the present embodiments enable dual thresholds and/or differing criteria for motion detection and motion alerts generated by the A/V recording and communication device. For example, an A/V recording and communication device may be configured to generate motion alerts, and to record audio and video footage, when an event is detected within a selected motion alert zone (e.g., within a defined radius around the A/V recording and communication device). However, the A/V recording and communication device may not generate a motion alert for an event detected outside of the selected motion alert zone, even though the device may still record audio and video footage for the detected event (e.g., when the event is within a selected motion detection zone). In certain of the present embodiments, the threshold for determining whether a motion alert for a user is generated or not may depend upon the nature and/or magnitude of the detected motion rather than on the location of the detected motion. For example, if the size of the moving object is above a threshold and/or if the magnitude of the detected motion is above a threshold, then a motion alert threshold may be triggered, and a motion alert for the user may be generated (A/V footage may also be recorded by the A/V recording and communication device in these instances). Conversely, if the size of the moving object is below the threshold and/or if the magnitude of the detected motion is below the threshold, then a motion detection threshold may be triggered and A/V footage may be recorded, but no motion alert for the user is generated.

In a first aspect, a computer-implemented method for an audio/video (A/V) recording and communication device is provided, the method comprising displaying, on a display of a computing device, a diagram of a field of view about the A/V recording and communication device; determining whether an input has been received to adjust a motion alert range of the A/V recording and communication device; when an input has been received to adjust the motion alert range of the A/V recording and communication device, increasing or decreasing the motion alert range of the A/V recording and communication device; determining whether an input has been received to adjust a motion detection range of the A/V recording and communication device; when an input has been received to adjust the motion detection range of the A/V recording and communication device, increasing or decreasing the motion detection range of the A/V recording and communication device; determining whether an input has been received to save any changed settings; and when an input has been received to save any changed settings, saving the changed settings.

In an embodiment of the first aspect, the A/V recording and communication device includes a set of motion sensors.

In another embodiment of the first aspect, the diagram comprises a set of motion zones, and wherein each of the motion zones corresponds to an area of a field of view of at least one of the set of motion sensors.

In another embodiment of the first aspect, determining whether an input has been received to adjust the motion alert range or the motion detection range of the A/V recording and communication device comprises detecting movement of a slider widget on the display of the computing device.

Another embodiment of the first aspect further comprises indicating a current setting of the motion alert range of the A/V recording and communication device with contrasting colors or shades of the same color on the display of the computing device.

In another embodiment of the first aspect, a darker area indicates an area where the A/V recording and communication device will generate a motion alert, and a lighter area indicates an area where the A/V recording and communication device will not generate a motion alert.

Another embodiment of the first aspect further comprises indicating a current setting of the motion detection range of the A/V recording and communication device with contrasting colors or shades of the same color on the display of the computing device.

In another embodiment of the first aspect, a darker area indicates an area where the A/V recording and communication device will detect motion, and a lighter area indicates an area where the A/V recording and communication device will not detect motion.

In a second aspect, a non-transitory machine readable medium of an electronic device storing an application executable by at least one processing unit of the electronic device is provided, the application comprising sets of instructions for displaying, on a display of a computing device, a diagram of a field of view about the A/V recording and communication device; determining whether an input has been received to toggle on or off a motion alert zone of the A/V recording and communication device; when an input has been received to toggle on or off a motion alert zone of the A/V recording and communication device, toggling on or off a selected motion alert zone of the A/V recording and communication device; determining whether an input has been received to toggle on or off a motion detection zone of the A/V recording and communication device; when an input has been received to toggle on or off a motion detection zone of the A/V recording and communication device, toggling on or off a selected motion detection zone of the A/V recording and communication device; determining whether an input has been received to save any changed settings; and when an input has been received to save any changed settings, saving the changed settings.

In an embodiment of the second aspect, the A/V recording and communication device includes at least one motion sensor.

In another embodiment of the second aspect, the diagram comprises at least one motion zone that corresponds to an area of a field of view of the at least one motion sensor.

In another embodiment of the second aspect, the set of instructions for determining whether an input has been received to toggle on or off the motion alert zone of the A/V recording and communication device comprises a set of instructions for detecting a selection of the motion alert zone on the display of the computing device.

In another embodiment of the second aspect, the set of instructions for determining whether an input has been received to toggle on or off the motion detection zone of the A/V recording and communication device comprises a set of instructions for detecting a selection of the motion detection zone on the display of the computing device.

In another embodiment of the second aspect, the program further comprises a set of instructions for indicating current settings of a plurality of motion alert zones of the A/V recording and communication device with contrasting colors or shades of the same color on the display of the computing device.

In another embodiment of the second aspect, darker areas indicate motion alert zones where the A/V recording and communication device will generate a motion alert, and lighter areas indicate motion alert zones where the A/V recording and communication device will not generate a motion alert.

In another embodiment of the second aspect, the program further comprises a set of instructions for indicating current settings of a plurality of motion detection zones of the A/V recording and communication device with contrasting colors or shades of the same color on the display of the computing device.

In another embodiment of the second aspect, darker areas indicate motion detection zones where the A/V recording and communication device will detect motion, and lighter areas indicate motion detection zones where the A/V recording and communication device will not detect motion.

In a third aspect, a method for an audio/video (A/V) recording and communication device is provided, the A/V recording and communication device including a camera, a processor, and a communication module, the method comprising detecting motion within a field of view of the camera of the A/V recording and communication device; recording video images captured within the field of view of the camera of the A/V recording and communication device; determining, at the processor, whether the detected motion is within a defined radius around the A/V recording and communication device; and when the detected motion is within the defined radius around the A/V recording and communication device, transmitting, by the communication module, a motion alert to at least one client device.

An embodiment of the third aspect further comprises, when the detected motion is outside the defined radius around the A/V recording and communication device, forgoing transmitting, by the communication module, the motion alert to the at least one client device.

In another embodiment of the third aspect, the radius around the A/V recording and communication device is defined by a user through a client device associated with the A/V recording and communication device.

In another embodiment of the third aspect, the device comprises a plurality of motion sensors, and wherein the defined radius comprises a plurality of motion zones each of which corresponds to an area of a field of view of at least one of the plurality of motion sensors.

Another embodiment of the third aspect further comprises, before determining whether the detected motion is within the defined radius, transmitting, by the communication module, the recorded video images to the at least one client device.

In a fourth aspect, a method for an audio/video (A/V) recording and communication device is provided, the A/V recording and communication device including a camera, a processor, and a communication module, the method comprising the A/V recording and communication device detecting motion within a field of view of the device, the processor determining whether the detected motion is within a defined radius around the A/V recording and communication device, if the detected motion is within the defined radius around the A/V recording and communication device, then the camera recording video images of the field of view of the device, and the communication module transmitting a motion alert, and if the detected motion is not within the defined radius around the A/V recording and communication device, then the camera recording video images of the field of view of the device, and the communication module not transmitting a motion alert.

In a fifth aspect, a method for an audio/video (A/V) recording and communication device is provided, the A/V recording and communication device including a camera, a processor, and a communication module, the method comprising the A/V recording and communication device detecting motion within a field of view of the device, the processor determining whether the detected motion is within a defined zone around the A/V recording and communication device, if the detected motion is within the defined zone around the A/V recording and communication device, then the camera recording video images of the field of view of the device, and the communication module transmitting a motion alert, and if the detected motion is not within the defined zone around the A/V recording and communication device, then the camera recording video images of the field of view of the device, and the communication module not transmitting a motion alert.

In a sixth aspect, a method for an audio/video (A/V) recording and communication device is provided, the A/V recording and communication device including a camera, a processor, and a communication module, the method comprising the A/V recording and communication device detecting motion within a field of view of the device, the processor determining whether characteristics of an object that generated the detected motion meet at least one defined parameter, if the characteristics of the object that generated the detected motion meet the at least one defined parameter, then the camera recording video images of the field of view of the device, and the communication module transmitting a motion alert, and if the characteristics of the object that generated the detected motion do not meet the at least one defined parameter, then the camera recording video images of the field of view of the device, and the communication module not transmitting a motion alert.

In an embodiment of the sixth aspect, the at least one defined parameter comprises a threshold size of the object that generated the detected motion.

In another embodiment of the sixth aspect, the at least one defined parameter comprises a shape of the object that generated the detected motion.

In a seventh aspect, a method for an audio/video (A/V) recording and communication device is provided, the A/V recording and communication device including a camera, a processor, and a communication module, the method comprising the A/V recording and communication device detecting motion within a field of view of the device, the processor determining whether characteristics of the detected motion meet at least one defined parameter, if the characteristics of the detected motion meet the at least one defined parameter, then the camera recording video images of the field of view of the device, and the communication module transmitting a motion alert, and if the characteristics of the detected motion do not meet the at least one defined parameter, then the camera recording video images of the field of view of the device, and the communication module not transmitting a motion alert.

In an embodiment of the seventh aspect, the at least one defined parameter comprises a threshold magnitude of the detected motion.

BRIEF DESCRIPTION OF THE DRAWINGS

The various embodiments of the present configurable motion detection and alerts for audio/video (A/V) recording and communication devices now will be discussed in detail with an emphasis on highlighting the advantageous features. These embodiments depict the novel and non-obvious configurable motion detection and alerts for audio/video (A/V) recording and communication devices shown in the accompanying drawings, which are for illustrative purposes only. These drawings include the following figures, in which like numerals indicate like parts.

DETAILED DESCRIPTION

Figure 1:
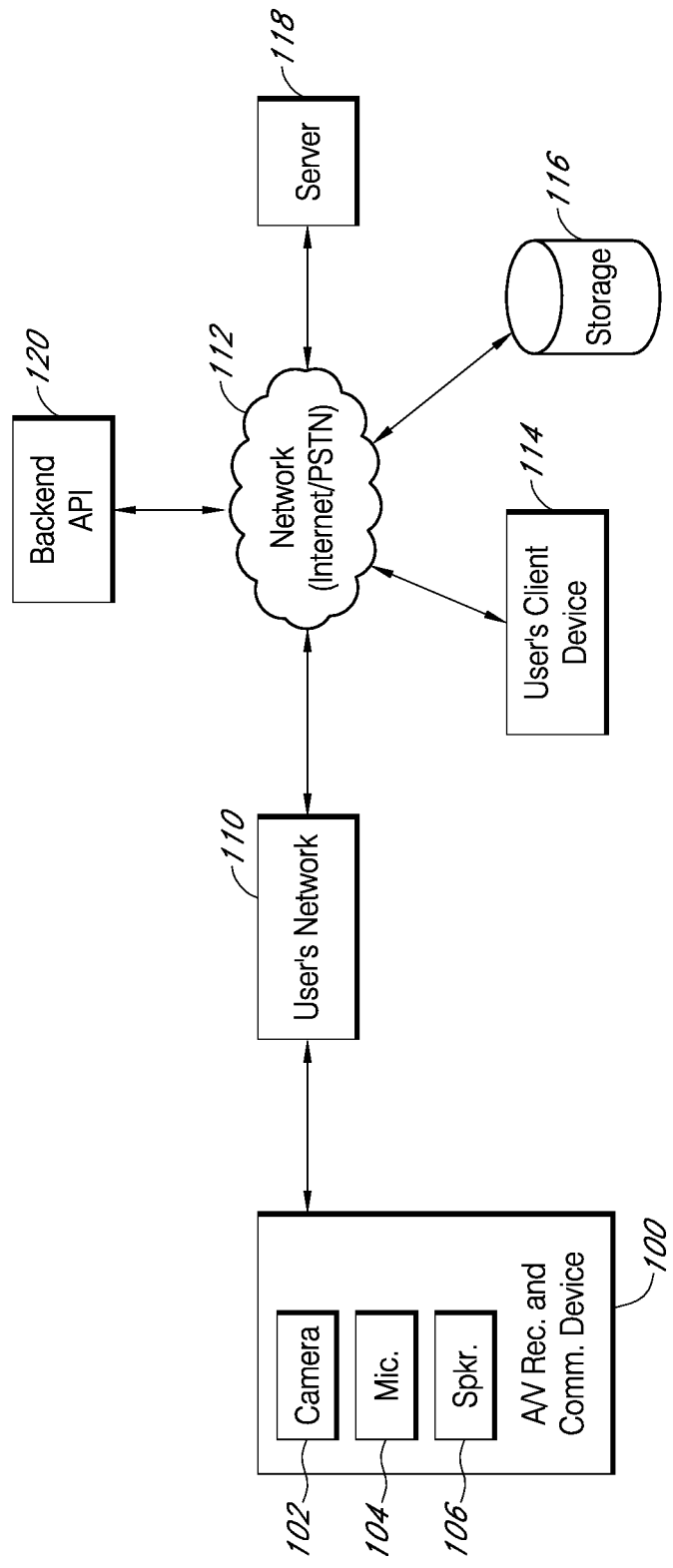
FIG. 1 is a functional block diagram illustrating a system for streaming and storing A/V content captured by an audio/video (A/V) recording and communication device according to the present embodiments.

The following detailed description describes the present embodiments with reference to the drawings. In the drawings, reference numbers label elements of the present embodiments. These reference numbers are reproduced below in connection with the discussion of the corresponding drawing features.

The embodiments of the present configurable motion detection and alerts for audio/video (A/V) recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication device 100, such as a video doorbell or a security camera. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 1080 p or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in U.S. Pat. No. 9,584,775 (application Ser. No. 14/499,828) and U.S. Patent Publication No. 2015/0022618 (application Ser. No. 14/334,922), both of which are incorporated herein by reference in their entireties as if fully set forth.

With further reference to FIG. 1, the A/V recording and communication device 100 may communicate with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the home network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the home wireless network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34 bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication doorbell 100 may also capture audio through the microphone 104. The A/V recording and communication device 100 may detect the visitor's presence using one or more motion sensors of the device, and/or by detecting that the visitor has depressed a doorbell button of the A/V recording and communication device 100 (e.g., if the A/V recording and communication device 100 is a video doorbell).

In response to the detection of the visitor, the A/V recording and communication device 100 sends an alert to the user's client device 114 (FIG. 1) via the user's home wireless network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
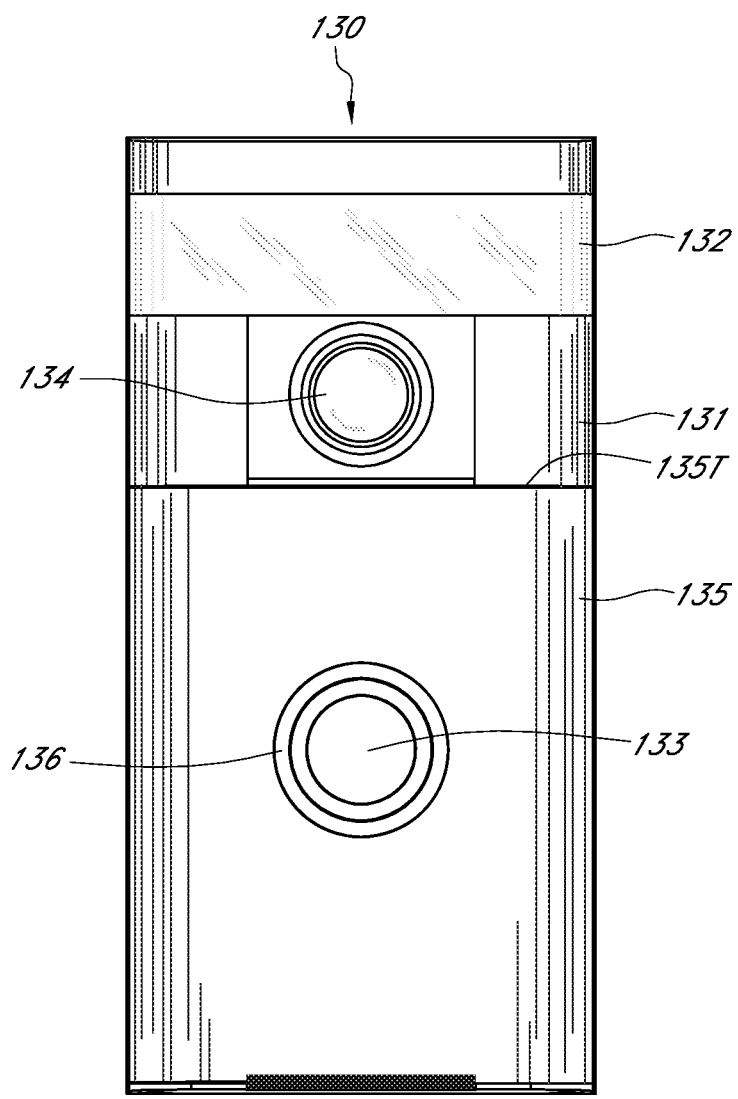
FIG. 2 is a front view of an A/V recording and communication doorbell according to an aspect of the present disclosure.
Figure 3:
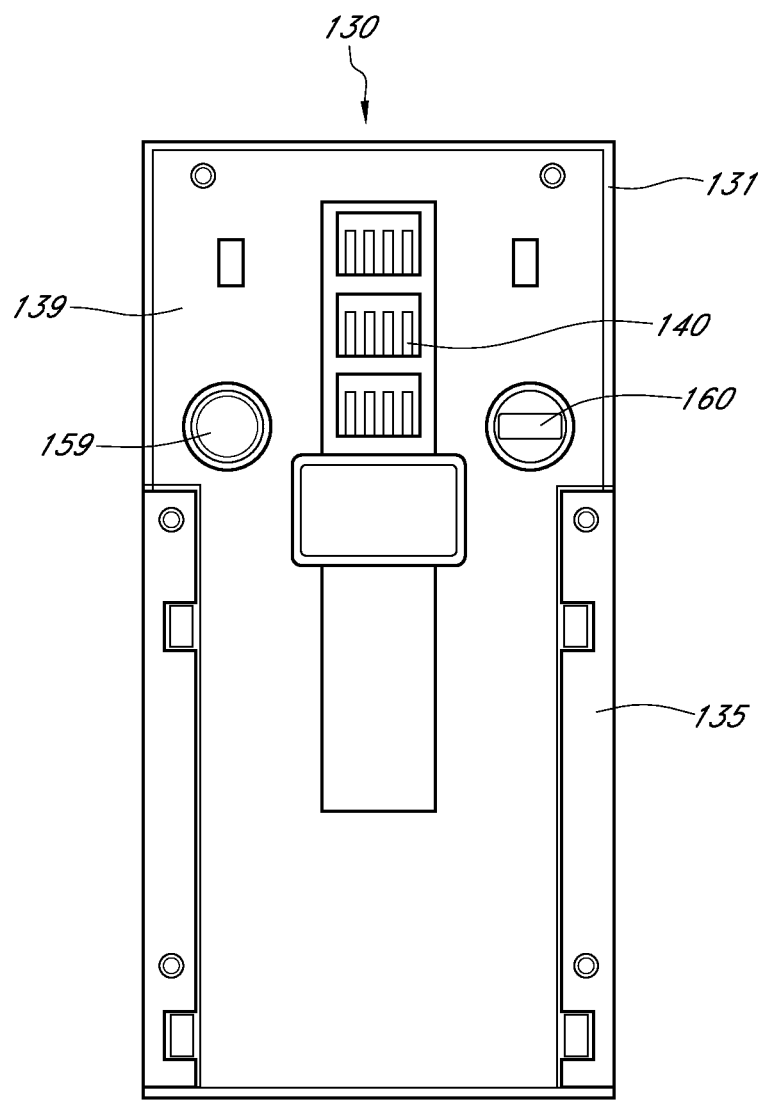
FIG. 3 is a rear view of the A/V recording and communication doorbell of FIG. 2.
Figure 4:
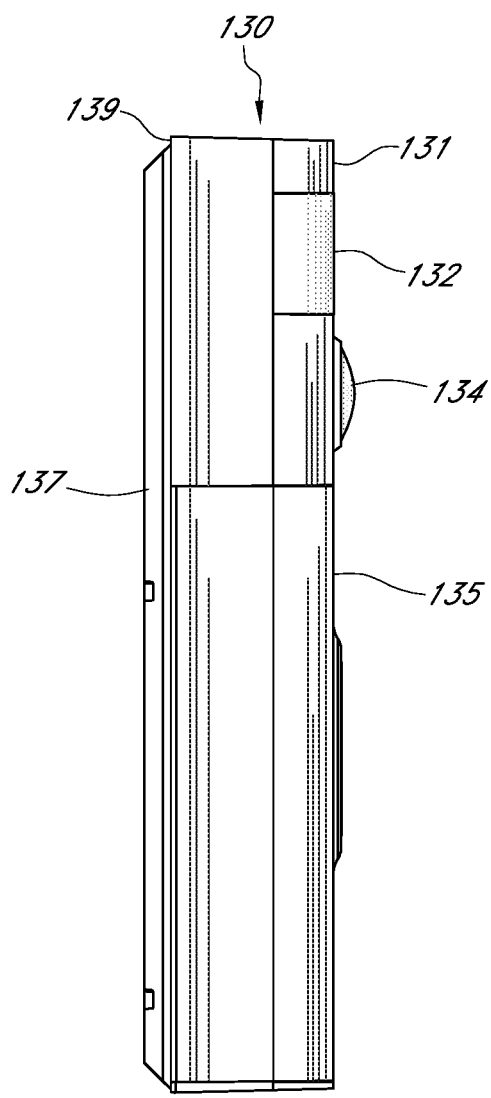
FIG. 4 is a left side view of the A/V recording and communication doorbell of FIG. 2 attached to a mounting bracket according to an aspect of the present disclosure.

FIGS. 2-4 illustrate an audio/video (A/V) communication doorbell 130 according to an aspect of present embodiments. FIG. 2 is a front view, FIG. 3 is a rear view, and FIG. 4 is a left side view of the doorbell 130 coupled with a mounting bracket 137. The doorbell 130 includes a faceplate 135 mounted to a back plate 139 (FIG. 3). With reference to FIG. 4, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 2, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 2 and 4, the doorbell 130 further includes an enclosure 131 that engages the faceplate 135. In the illustrated embodiment, the enclosure 131 abuts an upper edge 135T (FIG. 2) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 3 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 3, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 4 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 4, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 5:
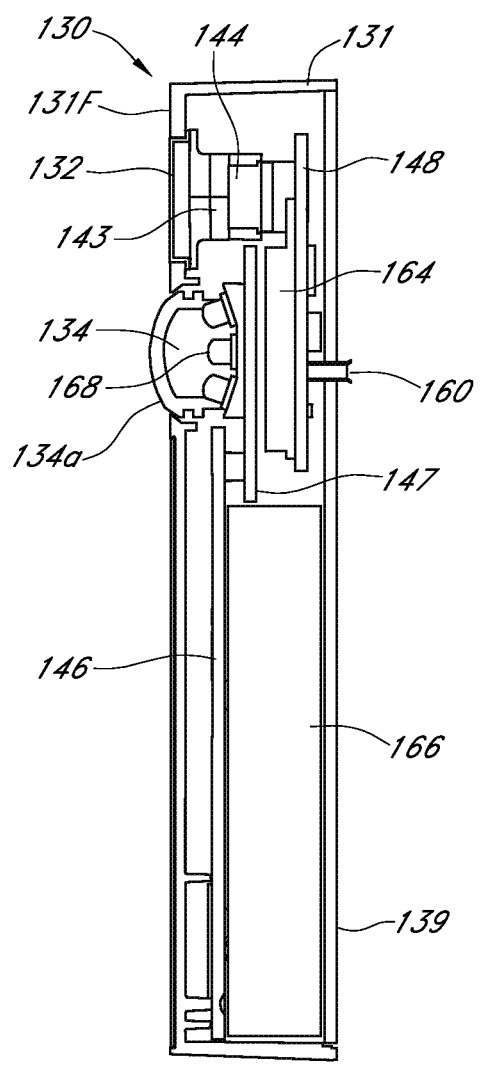
FIG. 5 is cross-sectional right side view of the A/V recording and communication doorbell of FIG. 2.

FIG. 5 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 5, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions.

With continued reference to FIG. 5, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 5, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 6:
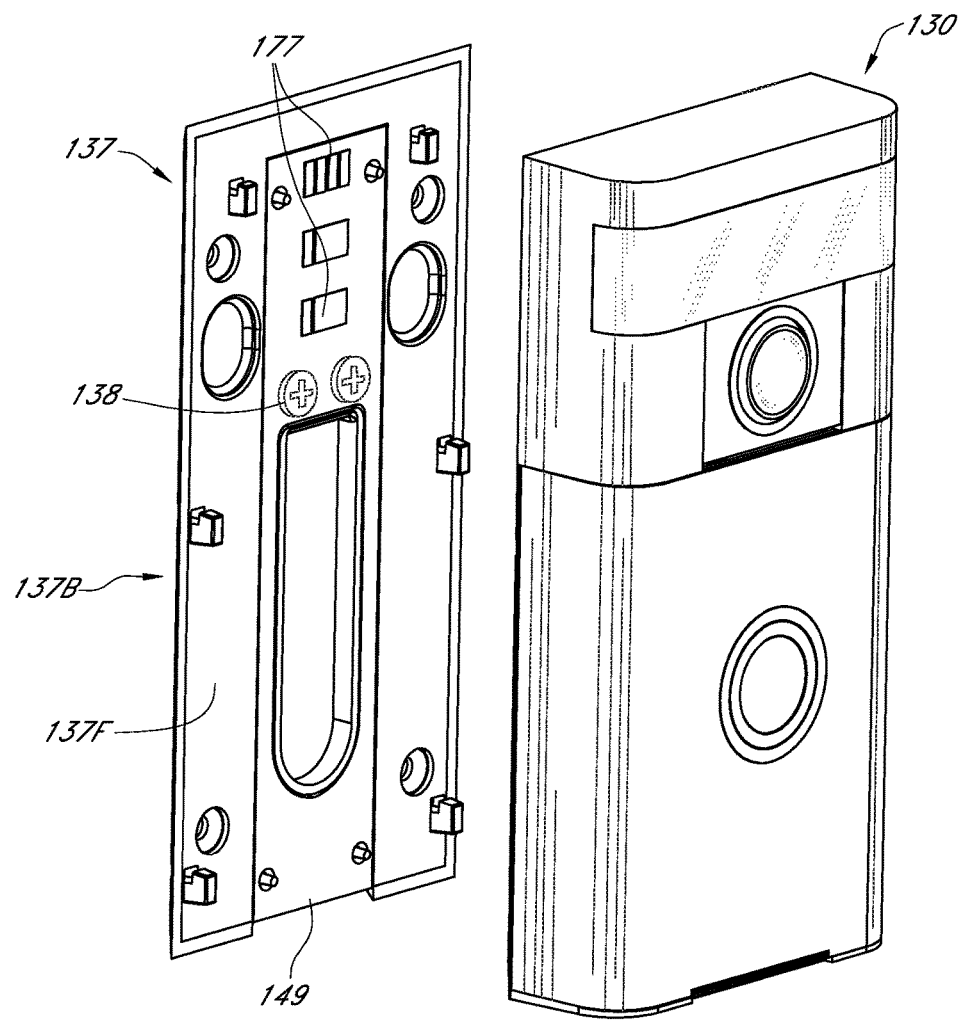
FIG. 6 is an exploded view of the A/V recording and communication doorbell and the mounting bracket of FIG. 4.

FIG. 6 is an exploded view of the doorbell 130 and the mounting bracket 137 according to an aspect of the present embodiments. The mounting bracket 137 is configured to be mounted to a mounting surface (not shown) of a structure, such as a home or an office. FIG. 6 shows the front side 137F of the mounting bracket 137. The mounting bracket 137 is configured to be mounted to the mounting surface such that the back side 137B thereof faces the mounting surface. In certain embodiments, the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 6, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 7:
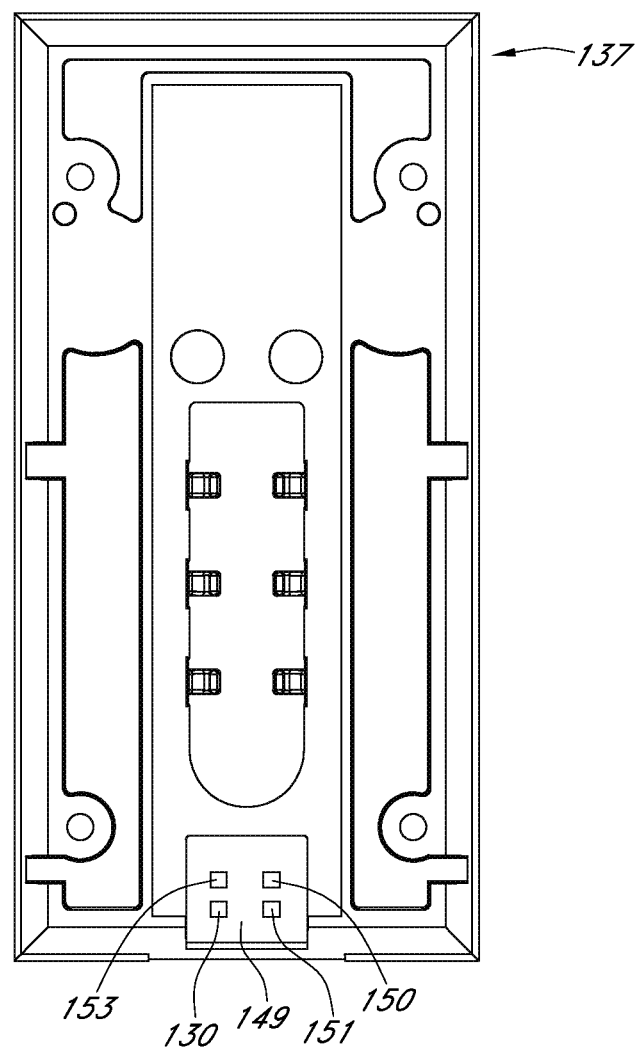
FIG. 7 is a rear view of the mounting bracket of FIG. 4.

With reference to FIGS. 6 and 7 (which is a rear view of the mounting bracket 137), the mounting bracket 137 further comprises a bracket PCB 149. With reference to FIG. 7, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 8A:
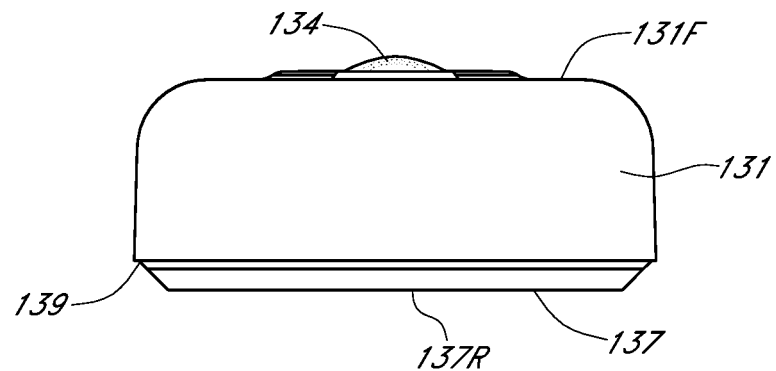
FIGS. 8A and 8B are top and bottom views, respectively, of the A/V recording and communication doorbell and the mounting bracket of FIG. 4.
Figure 8B:
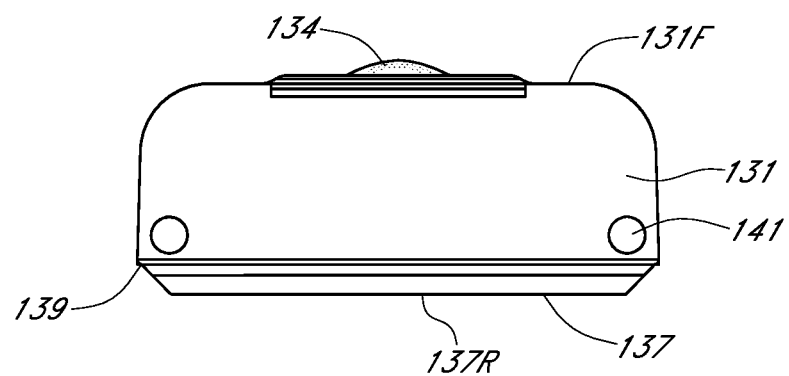

FIGS. 8A and 8B are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 8B, the lower end of the enclosure 131 may include security screw apertures 141 configured to receive screws or other fasteners.

Figure 9A:
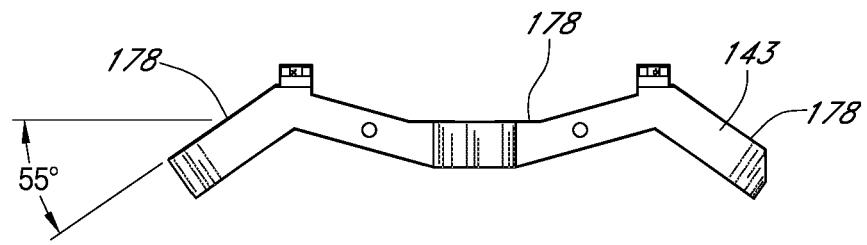
FIGS. 9A and 9B are top and front views, respectively, of a passive infrared sensor holder of the A/V recording and communication doorbell of FIG. 2.

FIG. 9A is a top view of the PIR sensor holder 143. The PIR sensor holder 143 may comprise any suitable material, including, without limitation, metals, metal alloys, or plastics. The PIR sensor holder 143 is configured to mount the PIR sensors 144 behind the lens 132 such that the PIR sensors 144 face out through the lens 132 at varying angles, thereby creating a wide field of view for the PIR sensors 144, and dividing the field of view into zones, as further described below. With further reference to FIG. 9A, the PIR sensor holder 143 includes one or more faces 178 within or on which the PIR sensors 144 may be mounted. In the illustrated embodiment, the PIR sensor holder 143 includes three faces 178, with each of two outer faces 178 angled at 55° with respect to a center one of the faces 178. In alternative embodiments, the angle formed by adjacent ones of the faces 178 may be increased or decreased as desired to alter the field of view of the PIR sensors 144.

Figure 9B:
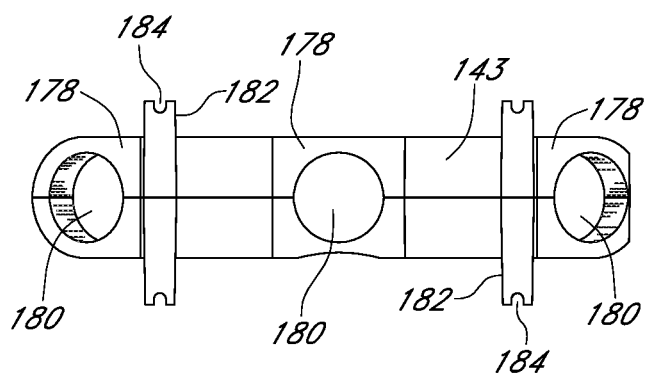

FIG. 9B is a front view of the PIR sensor holder 143. In the illustrated embodiment, each of the faces 178 includes a through hole 180 in which the PIR sensors 144 may be mounted. First and second brackets 182, spaced from one another, extend transversely across the PIR sensor holder 143. Each of the brackets 182 includes notches 184 at either end. The brackets 182 may be used to secure the PIR sensor holder 143 within the doorbell 130. In alternative embodiments, the through holes 180 in the faces 178 may be omitted. For example, the PIR sensors 144 may be mounted directly to the faces 178 without the through holes 180. Generally, the faces 178 may be comprise any structure configured to locate and secure the PIR sensors 144 in place.

Figure 10A:
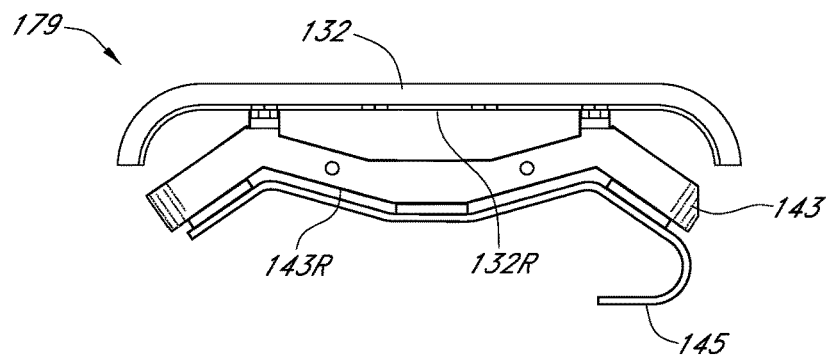
FIGS. 10A and 10B are top and front views, respectively, of a passive infrared sensor holder assembly of the A/V recording and communication doorbell of FIG. 2.
Figure 10B:
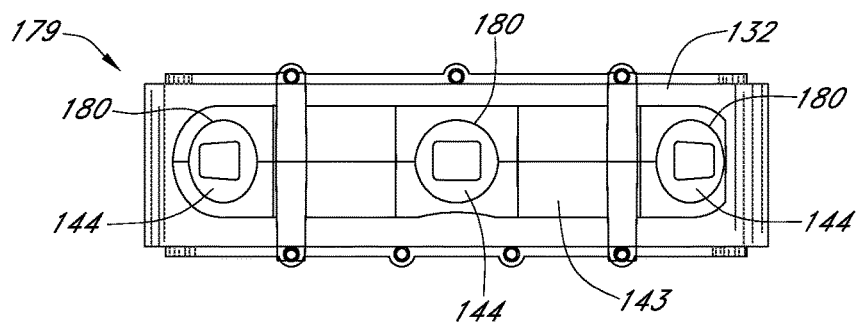

FIGS. 10A and 10B are top and front views, respectively, of a PIR sensor assembly 179, including the PIR sensor holder 143, the lens 132, and a flexible power circuit 145. The PIR sensor holder 143 may be secured to a rear face 132R of the lens 132, as shown, with the brackets 182 abutting the rear face 132R of the lens 132. The flexible power circuit 145, which may be any material or component capable of delivering power and/or data to and from the PIR sensors 144, is secured to a rear face 143R of the PIR sensor holder 143, and may be contoured to match the angular shape of the PIR sensor holder 143. The flexible power circuit 145 may connect to, draw power from, and/or transmit data to and/or from, the power PCB 148 (FIG. 5).

Figure 11:
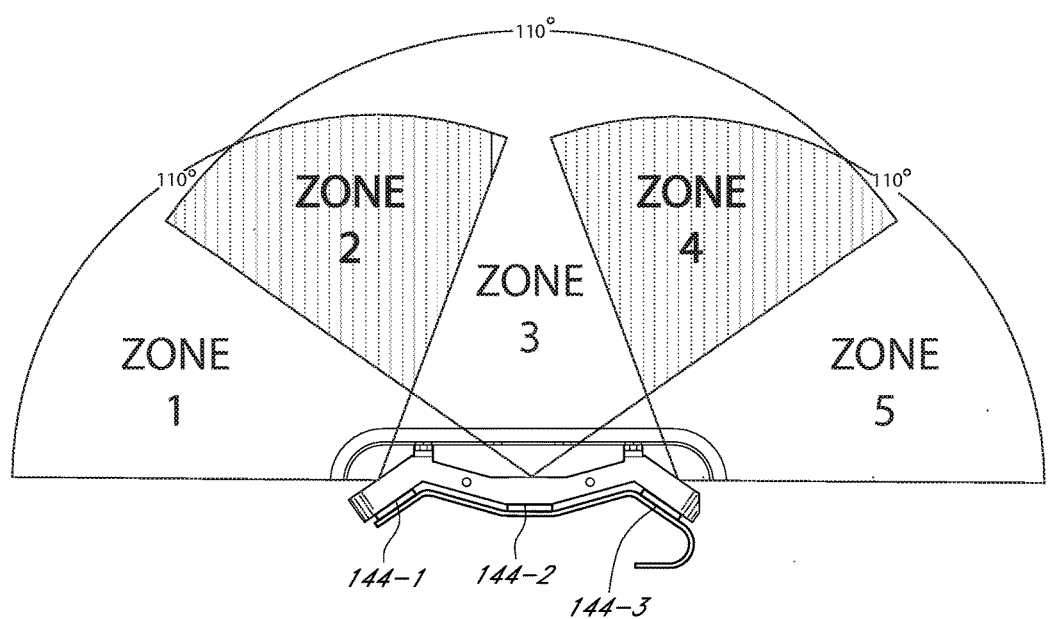
FIG. 11 is a top view of the passive infrared sensor assembly of FIG. 10A and a field of view thereof according to an aspect of the present disclosure.

FIG. 11 is a top view of the PIR sensor assembly 179 illustrating the fields of view of the PIR sensors 144. Each PIR sensor 144 includes a field of view, referred to as a "zone," that traces an angle extending outward from the respective PIR sensor 144. Zone 1 is the area that is visible only to Passive Infrared Sensor 144-1. Zone 2 is the area that is visible only to the PIR sensors 144-1 and 144-2. Zone 3 is the area that is visible only to Passive Infrared Sensor 144-2. Zone 4 is the area that is visible only to the PIR sensors 144-2 and 144-3. Zone 5 is the area that is visible only to Passive Infrared Sensor 144-3. The doorbell 130 may be capable of determining the direction that an object is moving based upon which zones are triggered in a time sequence. In the illustrated embodiment, each zone extends across an angle of 110°. In alternative embodiments, each zone may extend across a different angle, such as one greater than or less than 110°.

Figure 12:
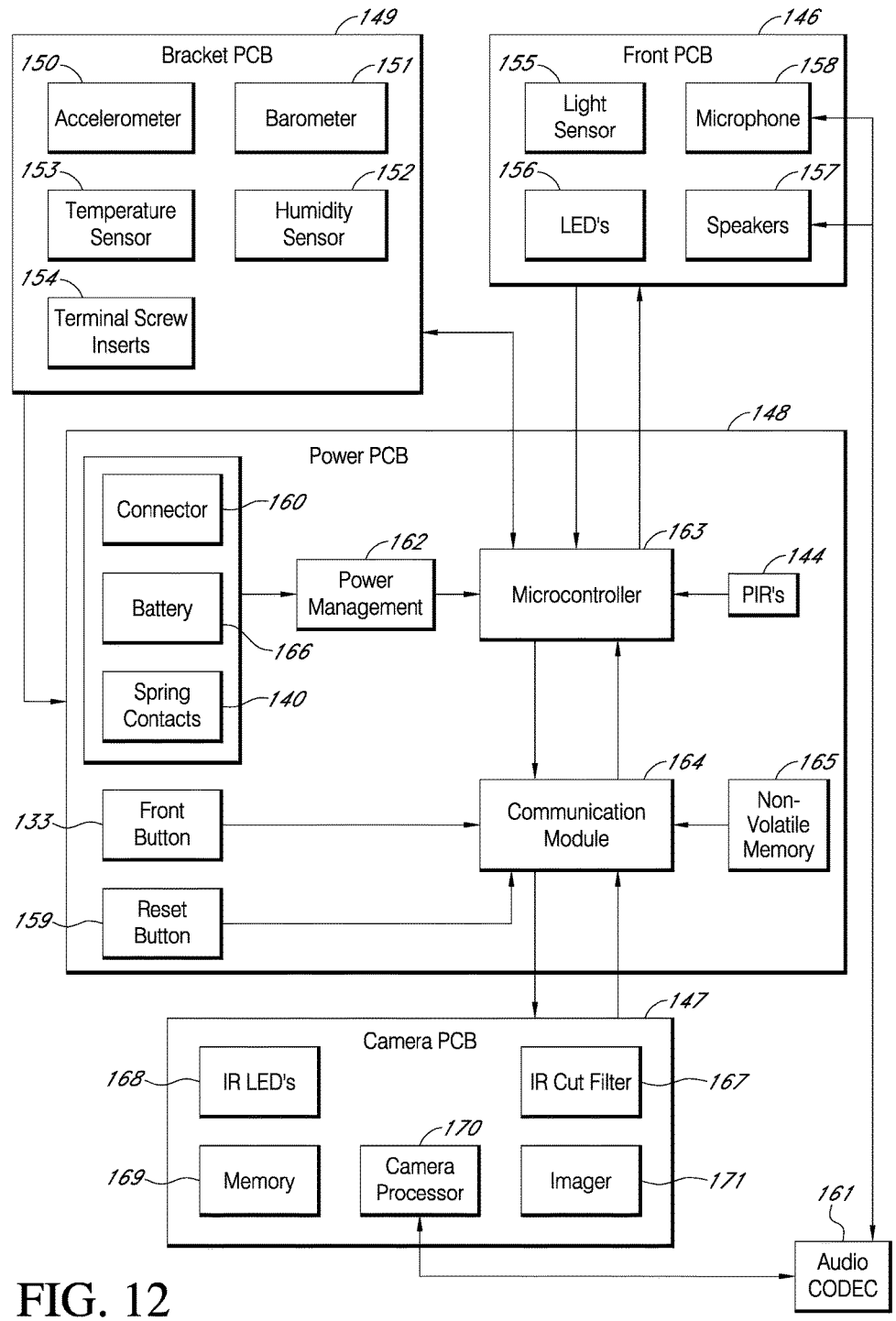
FIG. 12 a functional block diagram of the components of the A/V recording and communication doorbell of FIG. 2.

FIG. 12 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 12, the bracket PCB 149 may further comprise terminal screw inserts 154, which may be configured to receive the terminal screws 138 and transmit power to the electrical contacts 177 on the mounting bracket 137 (FIG. 6). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 12, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electromechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 2). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 12, the power PCB 148 may comprise a power management module 162, a microcontroller 163, the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163.

With further reference to FIG. 12, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions, such as those described below with reference to FIG. 14. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 12, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions, such as those described below with reference to FIG. 13. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 12, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

Figure 13:
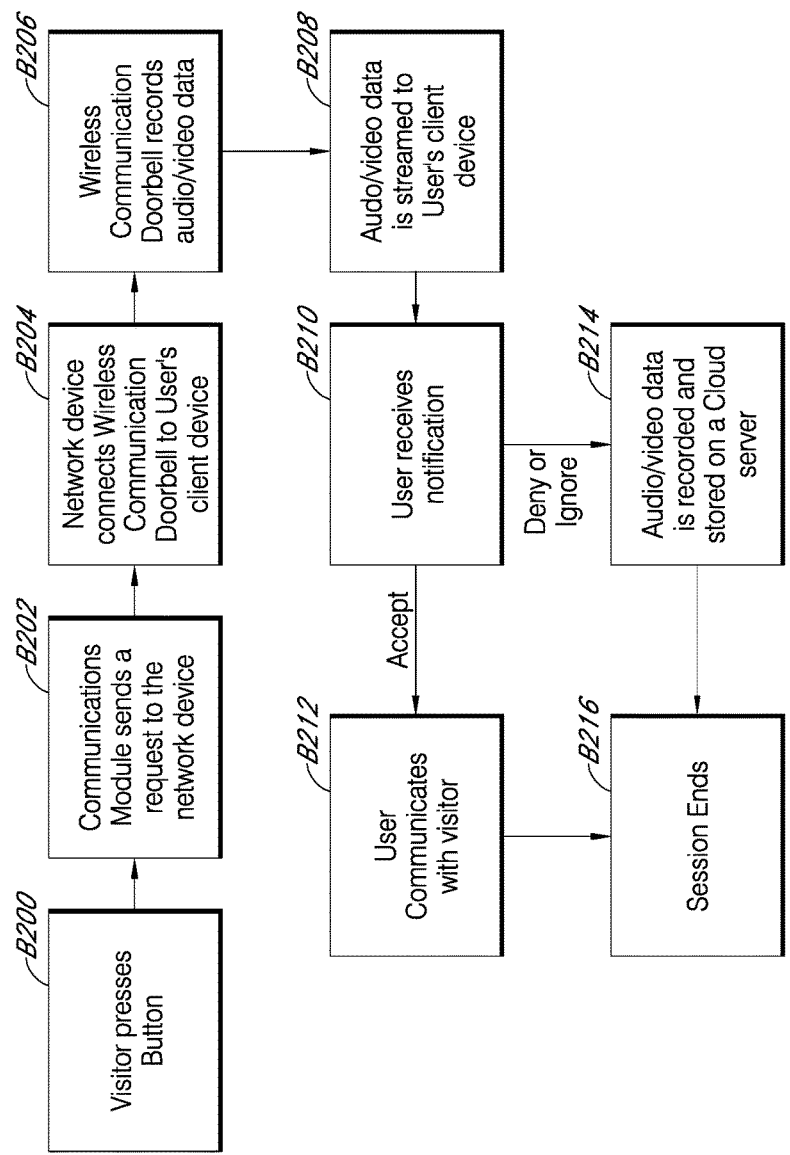
FIG. 13 is a flowchart illustrating a process for an A/V recording and communication doorbell according to an aspect of the present disclosure.

FIG. 13 is a flowchart illustrating one embodiment of a process according to an aspect of the present disclosure. At block B200, a visitor presses the button 133 on the doorbell 130. At block B202, the communication module 164 sends a request to a network device. Once the network device receives the request, at block B204 the network device may connect the doorbell 130 to the user's client device 114 through the user's wireless network 110 and the network 112. In block B206, the doorbell 130 may record available audio and/or video data using the camera 134, the microphone 158, and/or any other sensor available. At block B208, the audio and/or video data is transmitted to the user's client device 114. At block B210, the user may receive a notification on his or her client device 114 prompting him or her to either accept or deny. If the user denies the notification, then the process advances to block B214, where the audio and/or video data is recorded and stored at a cloud server. The session then ends at block B216 and the connection between the doorbell 130 and the user's client device 114 is terminated. If, however, the user elects to accept the notification, then at block B212 the user communicates with the visitor through the user's client device 114 while being provided audio and/or video data captured by the camera 134, the microphone 158, and/or other sensors. At the end of the call, the user may terminate the connection between the user's client device 114 and the doorbell 130 and the session ends at block B216. In some embodiments, the audio and/or video data may be recorded and stored at a cloud server (block B214) even if the user accepts the notification and communicates with the visitor through the user's client device 114.

Figure 14:
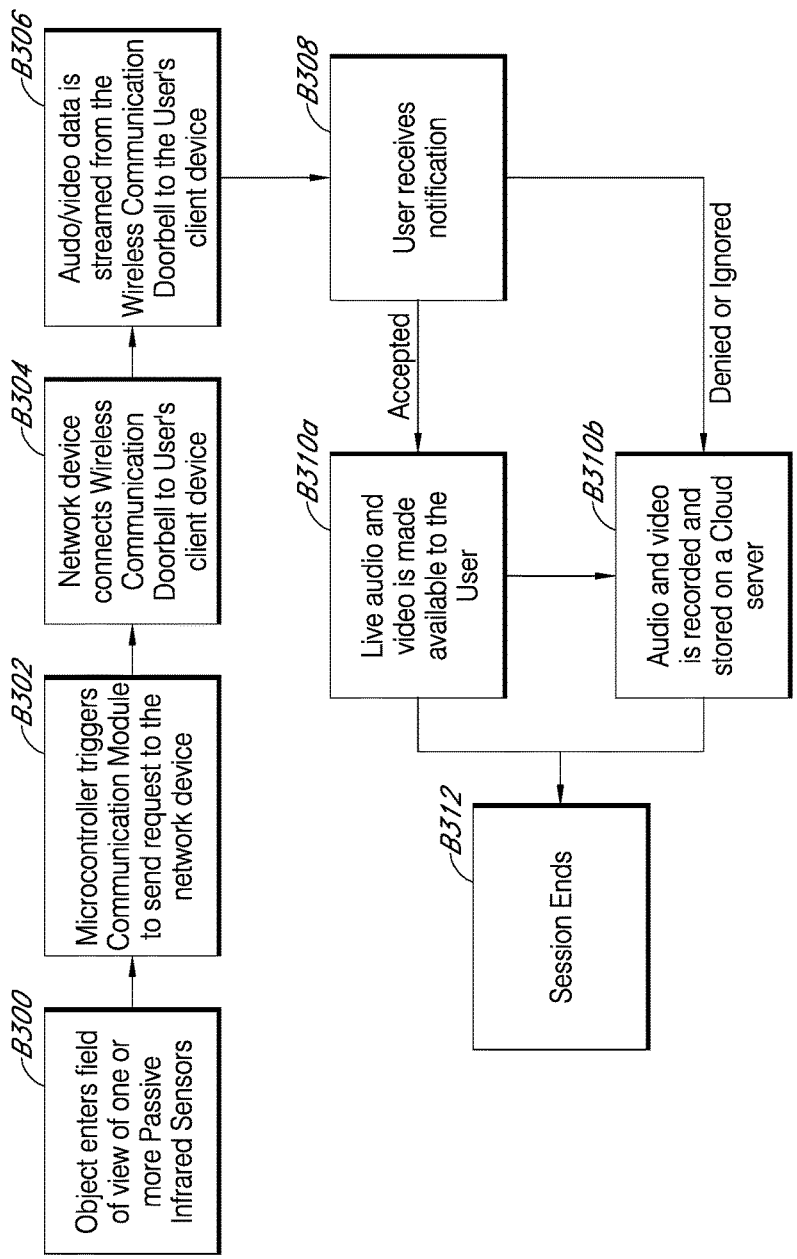
FIG. 14 is a flowchart illustrating another process for an A/V recording and communication doorbell according to an aspect of the present disclosure.

FIG. 14 is a flowchart illustrating another embodiment of a process according to an aspect of the present disclosure. At block B300, an object may move into the field of view of one or more of the PIR sensors 144. At block B302, the PIR sensors 144 may trigger the microcontroller 163, which may then trigger the communication module 164 to send a request to a network device. At block B304, the network device may connect the doorbell 130 to the user's client device 114 through the user's wireless network 110 and the network 112. At block B306, the doorbell 130 may record available audio and/or video data using the camera 134, the microphone 158, and/or any other available sensor, and stream the data to the user's client device 114. At block B308, the user may receive a notification prompting the user to either accept or deny the notification. If the notification is accepted, then at block B310a the live audio/video data may be displayed on the user's client device 114, thereby allowing the user surveillance from the perspective of the doorbell 130. When the user is satisfied with this function, the user may sever the connection at block B312, whereby the session ends. If, however, at block B308 the user denies the notification, or ignores the notification and a specified time interval elapses, then the connection between the doorbell 130 and the user's client device 114 is terminated and the audio/video data is recorded and stored at a cloud server at block B310b, such that the user may view the audio/video data later at their convenience. The doorbell 130 may be configured to record for a specified period of time in the event the notification in block B308 is denied or ignored. If such a time period is set, the doorbell 130 may record data for that period of time before ceasing operation at block B312 thereby ending the session. In some embodiments, the audio and/or video data may be recorded and stored at a cloud server (block B310b) even if the user accepts the notification and communicates with the visitor through the user's client device 114.

Figure 15:
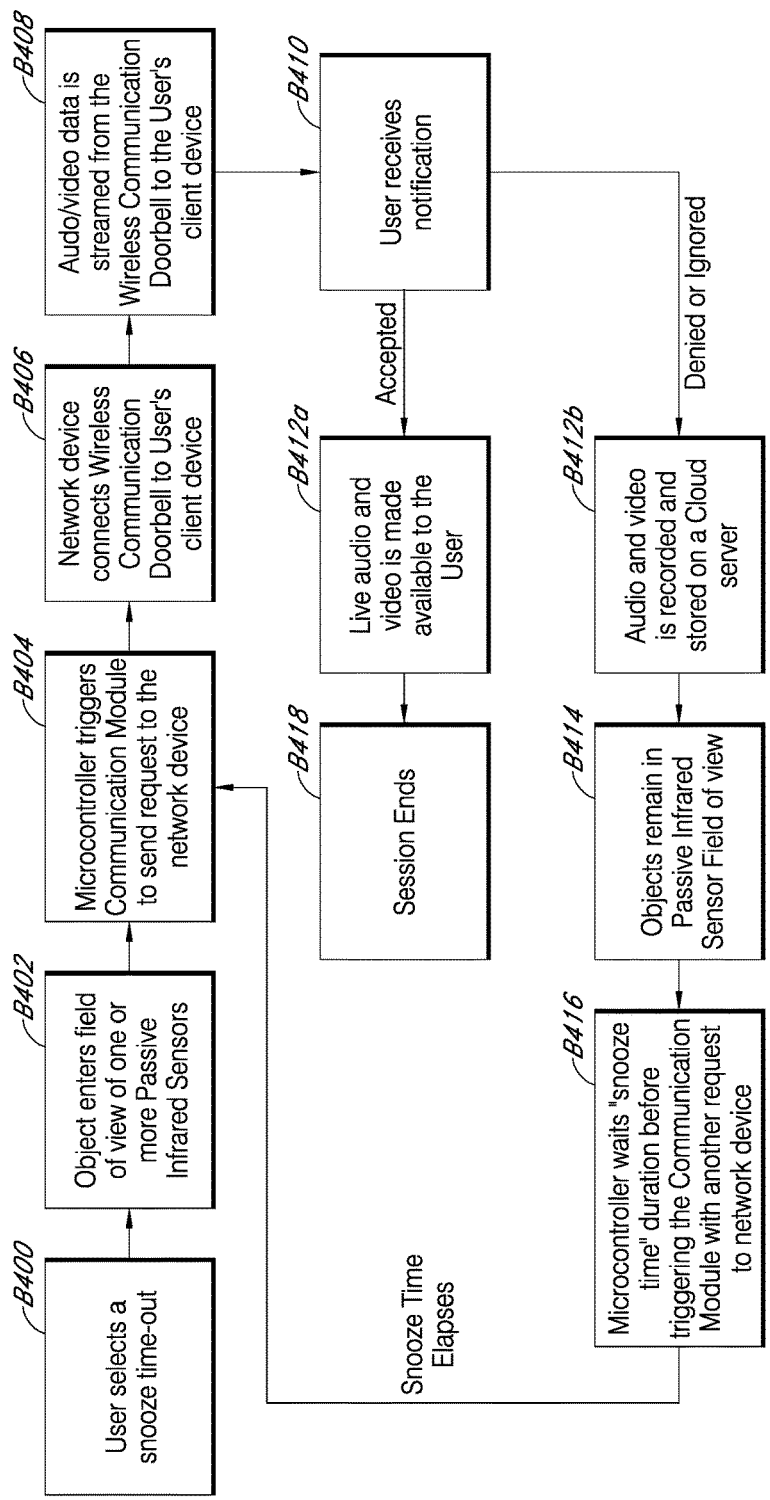
FIG. 15 is a flowchart illustrating another process for an A/V recording and communication doorbell according to an aspect of the present disclosure.

FIG. 15 is a flowchart illustrating another embodiment of a process according to an aspect of the present disclosure. At block B400, the user may select a "snooze time-out," which is a time period during which the doorbell 130 may deactivate or otherwise not respond to stimuli (such as light, sound, or heat signatures) after an operation is performed, e.g. a notification is either accepted or denied/ignored. For example, the user may set a snooze time-out of 15 minutes. At block B402, an object moves into the field of view of one or more of the PIR sensors 144. At block B404, the microcontroller 163 may trigger the communication module 164 to send a request to a network device. In block B406, the network device may connect the doorbell 130 to the user's client device 114 through the user's wireless network 110 and the network 112. At block B408, audio/video data captured by the doorbell 130 may be streamed to the user's client device 114. At block B410, the user may receive a notification prompting the user to either accept or deny/ignore the request. If the request is denied or ignored, then at block B412b audio/video data may be recorded and stored at a cloud server. After the doorbell 130 finishes recording, the objects may remain in the PIR sensor 144 field of view at block B414. In block B416, the microcontroller 163 waits for the "snooze time" to elapse, e.g. 15 minutes, before triggering the communication module 164 to submit another request to the network device. After the snooze time, e.g. 15 minutes, elapses, the process moves back to block B404 and progresses as described above. The cycle may continue like this until the user accepts the notification request at block B410. The process then moves to block B412a, where live audio and/or video data is displayed on the user's client device 114, thereby allowing the user surveillance from the perspective of the doorbell 130. At the user's request, the connection may be severed and the session ends at block B418. At this point the user may elect for the process to revert back to block B416, whereby there may be no further response until the snooze time, e.g. 15 minutes, has elapsed from the end of the previous session, or the user may elect for the process to return to block B402 and receive a notification the next time an object is perceived by one or more of the PIR sensors 144. In some embodiments, the audio and/or video data may be recorded and stored at a cloud server (block B412b) even if the user accepts the notification and communicates with the visitor through the user's client device 114.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

Figure 16:
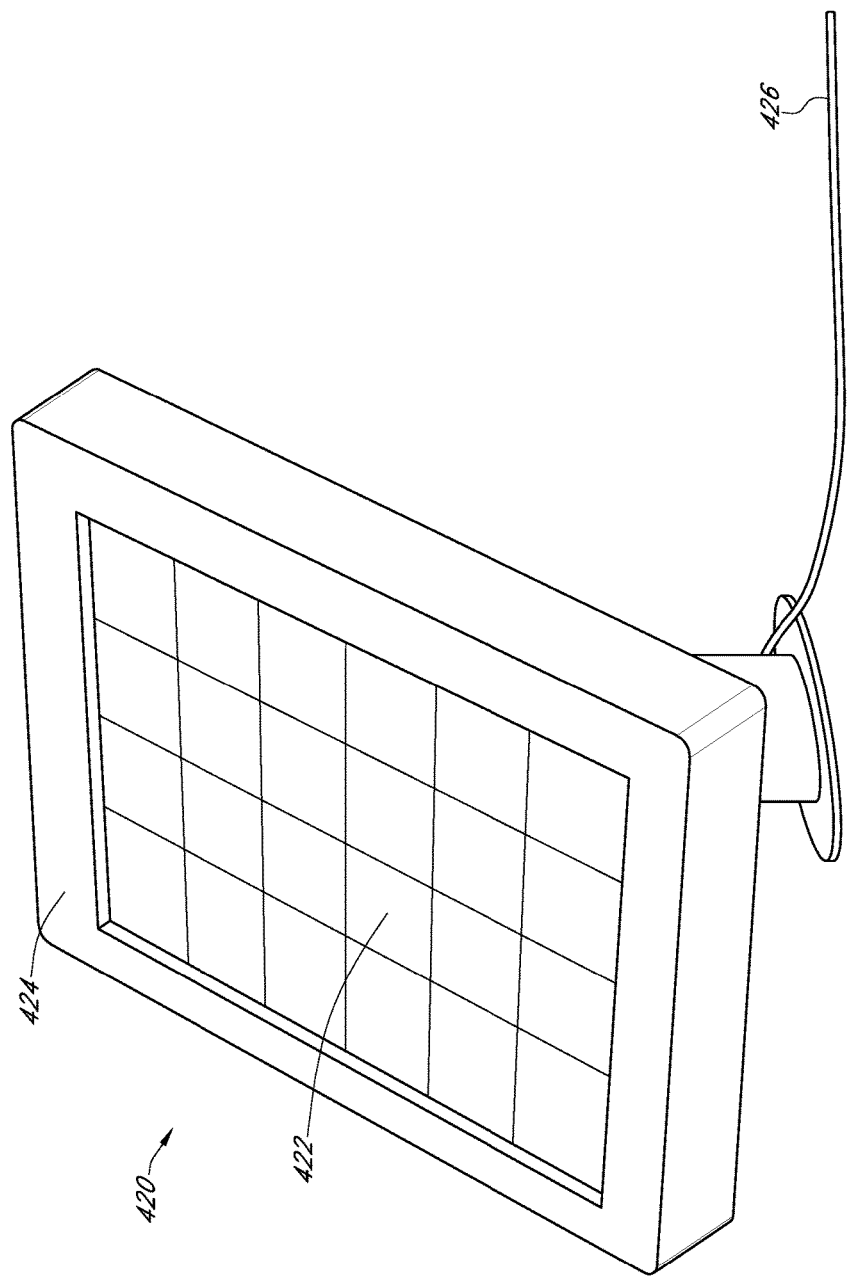
FIG. 16 is a front perspective view of a solar panel configured to provide power to an A/V recording and communication device according to an aspect of the present disclosure.

Some of the present embodiments may include an external solar panel for providing power to the A/V recording and communication device. For example, FIG. 16 illustrates a solar panel 420 comprising a plurality of photovoltaic modules 422 including a packaged, connected assembly of solar cells. The solar modules 422 use light energy (photons) from the sun to generate electricity through the photovoltaic effect. The solar modules 422 may include, for example, wafer-based crystalline silicon cells and/or thin-film cells based on, for example, cadmium telluride or silicon. The solar cells are secured to a structural (load carrying) member 424, and may be rigid or semi-flexible. In one non-limiting example, the total output power of the solar panel 420 may range from about 0.1 watts to about 5 watts, such as from about 0.5 watts to about 1 watt.

The solar panel 420 may include a power cable 426 having a connector (not shown) at a distal end. The connector may comprise, for example, a micro-USB or other connector configured to be received by the connector 160 of the doorbell 130. When the solar panel 420 is connected to the doorbell 130 via the power cable 426 and the connectors, the solar panel 420 may provide power to the doorbell 130 to recharge the battery 166 and/or to power other components of the doorbell 130.

As discussed herein, audio/video (A/V) recording and communication devices are configured to record audio and video footage of events that take place within their field of view. The recorded footage is useful in identifying, apprehending, and prosecuting criminal perpetrators. Thus, it is advantageous for A/V recording and communication devices to record as much footage as possible. However, users of A/V recording and communication devices do not necessarily want to receive an alert every time their devices detect motion and record footage. For example, a given A/V recording and communication device may be located in a high-traffic area, such as at the entrance to a home located on a busy street. Passing cars may from time to time trigger motion detection from the A/V recording and communication device. If the user receives an alert for every one of these events, the user may soon suffer from alert fatigue, which may cause the user to disable the motion detection function for his or her A/V recording and communication device. That device will thus not be able to record any audio and video footage in response to detecting motion, which may result in the device losing some of its value in identifying, apprehending, and prosecuting criminal perpetrators. It would be advantageous, therefore, if the user could configure the A/V recording and communication device so that it can detect motion and record audio and video footage without generating an excessive amount of motion alerts. As described below, the present embodiments provide these advantages.

For example, in certain embodiments according to the present disclosure the motion detection and alert functionality of the A/V recording and communication device may be configurable. The A/V recording and communication device may generate motion alerts for detected motion in selected zone(s) and/or within a selected radius. The A/V recording and communication device may further record audio and video footage when motion is detected outside of the selected zone(s) and/or outside the selected radius, but the device may not generate motion alerts for these events. Events that occur outside of the selected zone(s) and/or outside the selected radius may thus be recorded and can be useful in identifying, apprehending, and prosecuting criminal perpetrators, but these events will not lead to alert fatigue for the user.

To achieve these advantages, certain of the present embodiments enable dual thresholds and/or differing criteria for motion detection and motion alerts generated by the A/V recording and communication device. In one example, and as described in further detail below, a motion alert threshold may only be triggered, and a motion alert for the user may only be generated, when motion is detected within a defined radius around the A/V recording and communication device, and/or when motion is detected within one or more defined zones around the A/V recording and communication device. A/V footage may also be recorded by the A/V recording and communication device in these instances. Conversely, when motion is detected outside the defined radius around the A/V recording and communication device, and/or when motion is detected outside of the one or more defined zones around the A/V recording and communication device, a motion detection threshold may be triggered and A/V footage may be recorded, but no motion alert for the user is generated.

In certain of the present embodiments, the threshold for determining whether a motion alert for the user is generated or not may depend upon the nature and/or magnitude of the detected motion rather than on the location of the detected motion. For example, if the size of the moving object is above a threshold and/or if the magnitude of the detected motion is above a threshold, then a motion alert threshold may be triggered, and a motion alert for the user may be generated. A/V footage may also be recorded by the A/V recording and communication device in these instances. Conversely, if the size of the moving object is below the threshold and/or if the magnitude of the detected motion is below the threshold, then a motion detection threshold may be triggered and A/V footage may be recorded, but no motion alert for the user is generated.

In certain embodiments according to the present disclosure, the user may independently configure motion alert settings and motion detection settings of the A/V recording and communication device. For example, the user may set (or adjust) a first range for motion alerts ("motion alert range") and a second range for motion detection ("motion detection range"). The first range may be shorter than the second range. In another example, the user may select (or toggle ON and OFF) one or more zones (areas of the field of view of the A/V recording and communication device) to be active or inactive for motion alerts ("motion alert zones"), and select (or toggle ON and OFF) one or more zones to be active or inactive for motion detection ("motion detection zones"). In still another example, the foregoing two examples may be combined. For example, the user may set (or adjust) ranges for motion alerts and motion detection and also select (or toggle ON and OFF) one or more zones for motion alerts and motion detection. The user's changes to the motion alert settings and motion detection settings may affect the alerts that the user receives from the A/V recording and communication device. For example, the user may turn off selected motion alert zones and/or decrease the range for motion alerts to reduce "false alarm" alerts (or nuisance alerts), such as those generated by passing cars.

The user may configure motion alert settings and motion detection settings in any suitable fashion, such as with a graphical user interface (GUI). The GUI may be displayed on the user's client device, which may be, for example, a computer or a mobile device, such as a smartphone. The user's client device may be, for example, the client device 114 described above. Example GUIs, systems, and methods for configuring motion settings for A/V recording and communication devices are described in U.S. Patent Publication No. 2016/0191864 (application Ser. No. 14/981,096 filed on Dec. 28, 2015), which is incorporated herein by reference in its entirety as if fully set forth.

Figure 17:
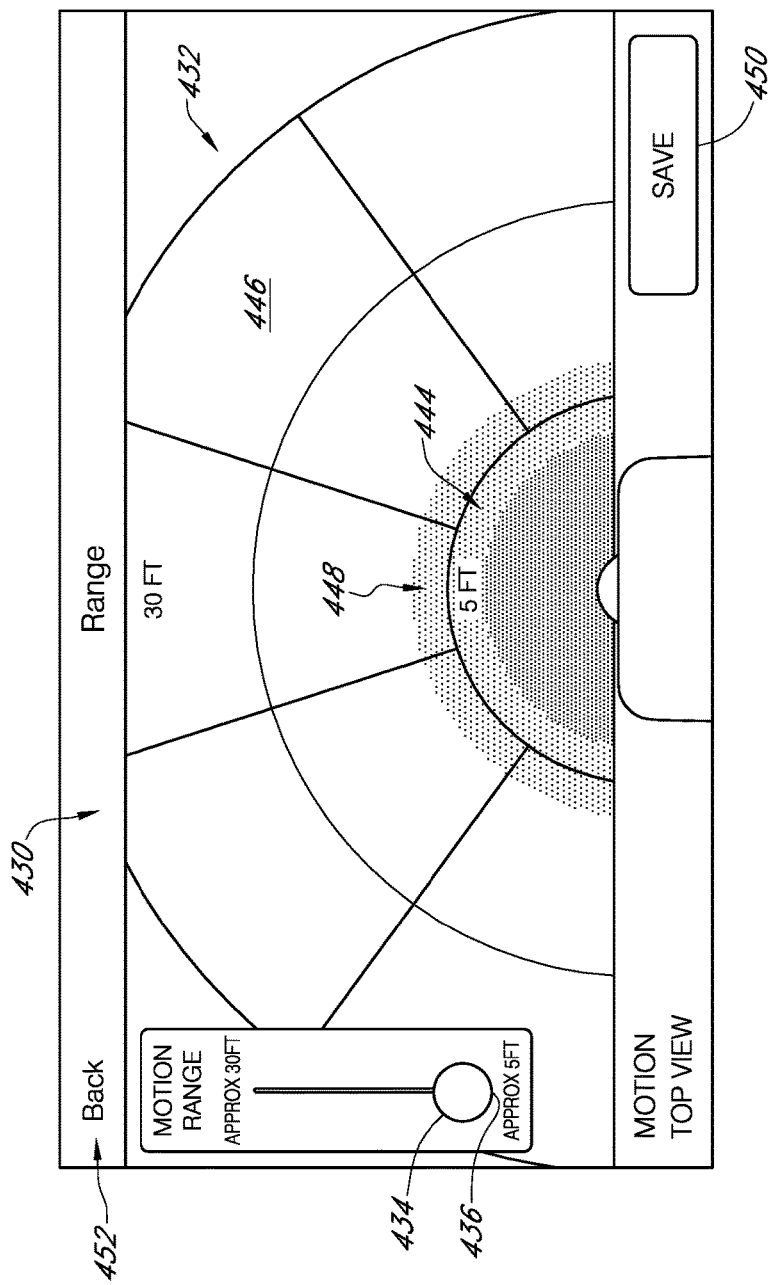
FIGS. 17-19 are screenshots of a graphical user interface for modifying settings of an A/V recording and communication device according to an aspect of the present disclosure.
Figure 18:
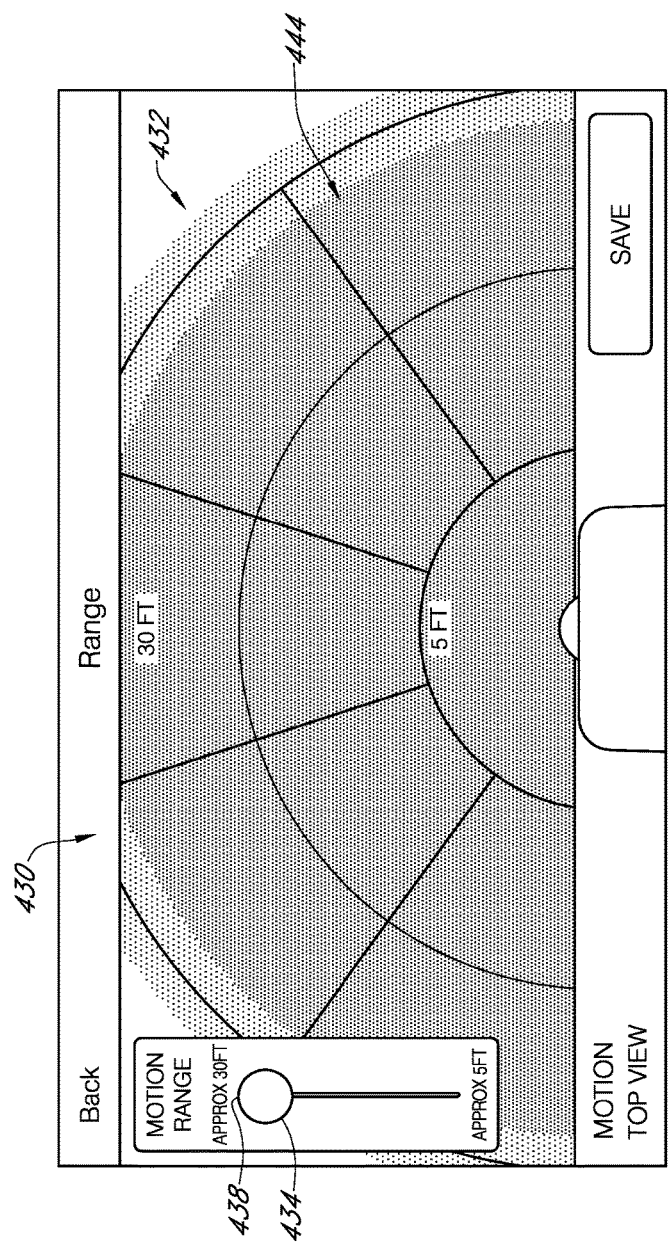
Figure 19:
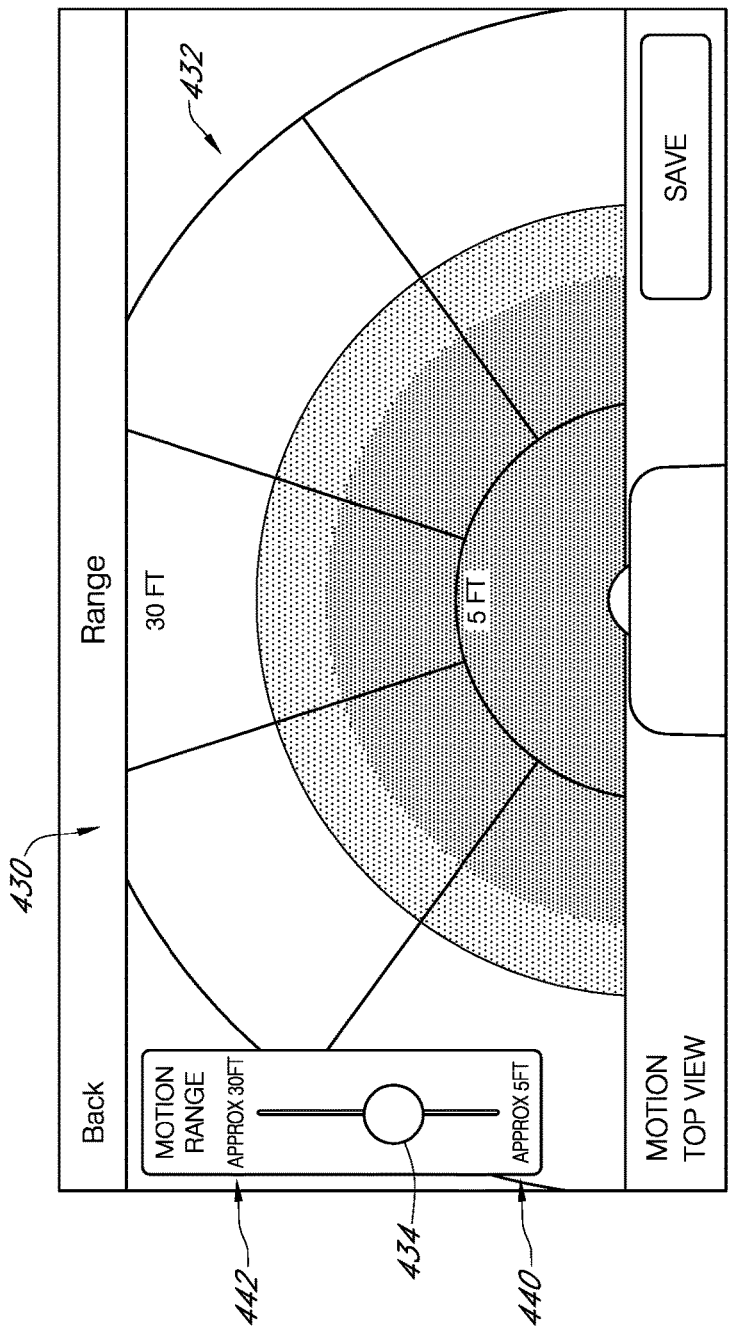

FIGS. 17-19 are screenshots of one example of a GUI 430 for setting (or adjusting) a first range (or distance) for motion alerts ("motion alert range") and a second range (or distance) for motion detection ("motion detection range") of the A/V recording and communication device 130 according to an aspect of the present disclosure. In one example, the user may modify settings by selecting a menu choice from within a software application installed on the user's client device 114. The menu choice may specify which of the motion detection range and the motion alert range should be modified in some of the present embodiments. That is, some aspects of the present embodiments may provide a first menu option (or control button) for modifying the motion alert range and a second menu option (or control button) for modifying the motion detection range. In some aspects of the present embodiments the same GUI 430 is used to adjust the motion alert range and the motion detection range, while in other embodiments different GUIs are presented to the user for different types of adjustments (e.g., motion detection adjustment and motion alert adjustment).

With reference to FIG. 17, upon selecting the menu choice for modifying the range settings of the A/V recording and communication device 130, the software application may display, on a display 806 (FIG. 30) of the user's client device 114, a diagram 432 of the field of view about the A/V recording and communication device 130. In the embodiment illustrated in FIG. 17, the diagram 432 is a top view, but in alternative embodiments the diagram 432 may be presented from a different perspective, such as a front view or a side view.

With reference to FIGS. 17-19, the GUI 430 further includes a range adjustment component 434 that enables the user to set the first and second ranges for motion alerts and motion detection, respectively (collectively "motion sensitivity ranges"), for the A/V recording and communication device 130. In the illustrated embodiment, the motion sensitivity range adjustment component 434 comprises a slider widget. A first end 436, or lower end, of the range of the slider widget 434 corresponds to a minimum motion sensitivity range (FIG. 17) of the A/V recording and communication device 130, and a second end 438, or upper end, of the range of the slider widget 434 corresponds to a maximum motion sensitivity range of the A/V recording and communication device 130. By sliding the widget 434 upward, as shown in FIG. 18, the user may increase the motion sensitivity range of the A/V recording and communication device 130, and by sliding the widget downward, as shown in FIG. 17, the user may decrease the motion sensitivity range of the A/V recording and communication device 130. The first and second ends 436, 438 of the slider widget 434 may include text indicating the distance corresponding to the minimum and maximum motion sensitivity ranges. With reference to FIG. 19, in the illustrated embodiment, the minimum range 440 is indicated as approximately five feet, while the maximum range 442 is indicated as approximately thirty feet. These ranges are merely examples, and are not limiting. In fact, in certain embodiments the textual indicators of the minimum and maximum ranges may not be provided at all.

With further reference to FIG. 17, the current range setting is indicated on the diagram 432 by contrasting colors or shades of the same color, with a darker area indicating the active or ON area 444 where the A/V recording and communication device 130 will detect motion and/or trigger motion alerts, and a lighter area indicating the inactive or OFF area 446 where the A/V recording and communication device 130 will not detect motion and/or not trigger motion alerts. In the present embodiments, the first range setting (for motion alerts) and the second range setting (for motion detection) may be set/adjusted on separate screens within the application executing on the user's client device 114, and each screen may include an indicator, such as text (not shown), that indicates to the user which setting is being adjusted on that screen. Alternatively, or in addition, the application executing on the user's client device 114 may show the user one or more prompts before each screen is displayed, or while each screen is displayed, on the client device 114, with each prompt indicating which setting will be adjusted on the next screen, or on the current screen.

With further reference to FIG. 17, a transition area 448 between the ON area and the OFF area is indicated by a color/shade between the darker area 444 and the lighter area 446, with the color of the transition area 448 fading gradually toward the OFF area 446. In certain embodiments, the transition area 448 is part of the ON area 444, such that the A/V recording and communication device 130 will detect motion and/or trigger motion alerts in the transition area 448, but in other embodiments the transition area 448 may be part of the OFF area 446, such that the A/V recording and communication device 130 will not detect motion and/or trigger motion alerts in the transition area 448.

In the configuration of FIG. 17, the motion sensitivity range of the A/V recording and communication device 130 is set to the minimum (slider widget 434 at first end 436). By contrast, in the configuration of FIG. 18 the motion sensitivity range is set to the maximum (slider widget 434 at second end 438), and in the configuration of FIG. 19, the motion sensitivity range is set roughly halfway between the minimum and maximum settings. When the user has set a desired motion sensitivity range, he or she may select the SAVE button 450 to update that setting for the A/V recording and communication device 130. The user may then close the diagram 432 by selecting the BACK button 452, which may return the user to a previous screen (not shown) within the application executing on the user's client device 114.

Figure 20:
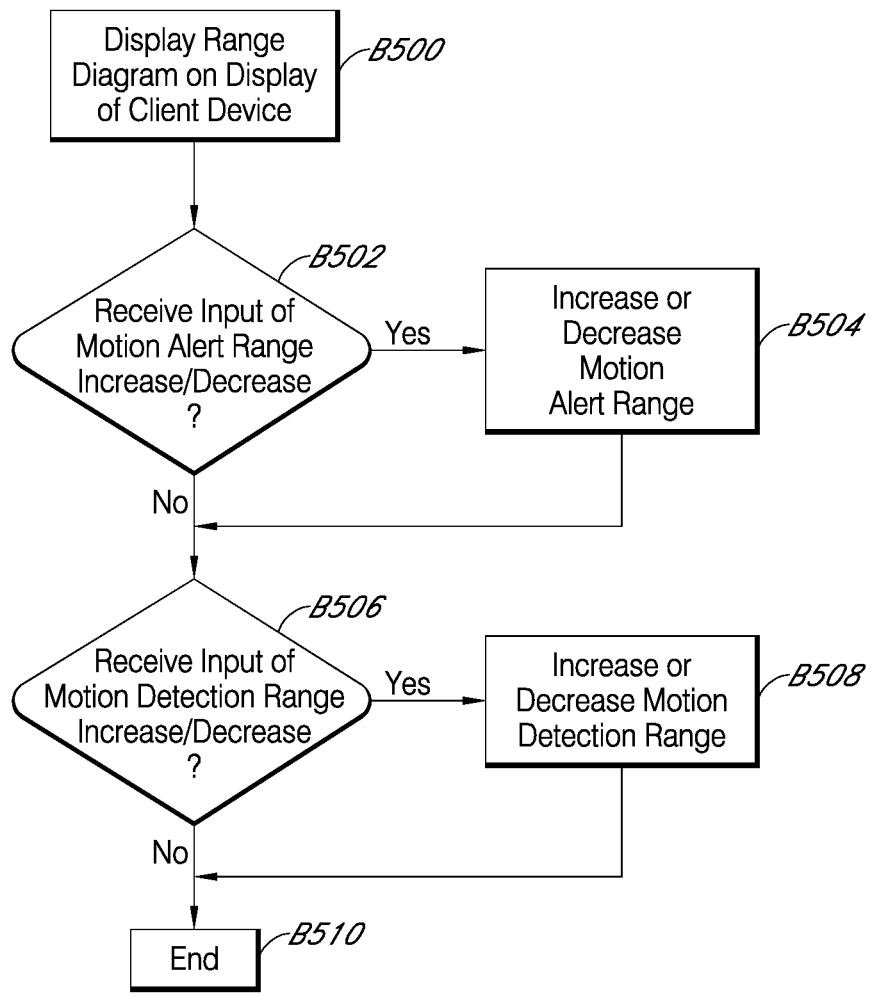
FIG. 20 is a flowchart illustrating a process according to an aspect of the present disclosure.

FIG. 20 is a flowchart illustrating an embodiment of a process according to the present disclosure. According to the process shown in FIG. 20, a user may remotely modify the motion sensitivity settings of an A/V recording and communication device, such as the A/V doorbell 100 (FIG. 1) or the A/V recording and communication device 130 (FIG. 2).

At block B500, a diagram of the field of view about the A/V recording and communication device 130 is displayed on a display of the user's client device 114. The diagram may be the same as, or similar to, the diagram 432 described above with reference to FIGS. 17-19. The displaying of the diagram 432 on the display of the user's client device 114 may be performed by application software executing on the user's client device 114, for example.

With further reference to FIG. 20, at block B502 the process determines whether an input has been received to adjust (increase or decrease) the motion alert range of the A/V recording and communication device 130. The input may come from the user, for example by sliding the slider widget 434 up or down on a motion alert range adjustment screen displayed on the display 806 (FIG. 30), as described above with reference to FIGS. 17-19, followed by selecting the SAVE button 450. If an input is received to adjust the motion alert range of the A/V recording and communication device 130, then the process moves to block B504, where the motion alert range of the A/V recording and communication device 130 is increased or decreased and the changed setting is saved. If, however, no input is received to adjust the motion alert range of the A/V recording and communication device 130, then the process moves to block B506.

At block B506, the process determines whether an input has been received to adjust the motion detection range of the A/V recording and communication device 130. The input may come from the user, for example by sliding the slider widget 434 up or down on a motion detection range adjustment screen displayed on the display 806 (FIG. 30), as described above with reference to FIGS. 17-19, followed by selecting the SAVE button 450. If an input is received to adjust the motion detection range of the A/V recording and communication device 130, then the process moves to block B508, where the motion detection range of the A/V recording and communication device 130 is increased or decreased and the changed setting is saved. The process then ends at block B510. If, however, no input is received to adjust the motion detection range of the A/V recording and communication device 130, then the process ends at block B510.

In certain embodiments, saving any changed settings may further comprise sending the changed settings to a network and/or a network device (such as the network 112, the server 118, and/or the backend API 120 of FIG. 1), from which the A/V recording and communication device 130 may subsequently download the changed settings. For example, to implement the new motion sensitivity range settings in the A/V recording and communication device 130, the backend API 120 may communicate with the A/V recording and communication device 130. In the process of the communication, the backend API 120 may provide the updated user settings and instruct the A/V recording and communication device 130 to overwrite any previous settings.

Figure 20A:
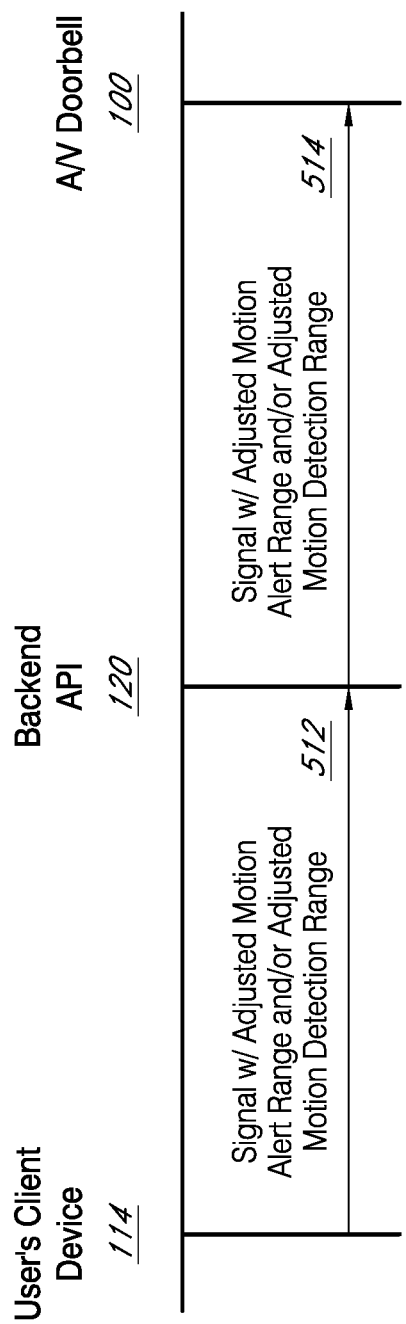
FIG. 20A is a sequence diagram illustrating an aspect of the process of FIG. 20.

FIG. 20A is a sequence diagram illustrating an aspect of the process of FIG. 20. As described above with reference to FIG. 20, one or more user inputs may be received to adjust (increase or decrease) the motion alert range of the A/V recording and communication device 130 and/or to adjust (increase or decrease) the motion detection range of the A/V recording and communication device 130. With reference to FIG. 20A, after the input(s) are received at the user's client device 114, the user's client device 114 may send a signal 512 to the backend API 120, and the backend API 120 may receive the signal 512 from the user's client device 114. The signal 512 may include the adjusted motion alert range and/or the adjusted motion detection range. After receiving the signal 512 from the user's client device 114, the backend API 120 may send a signal 514 to the A/V recording and communication device 130, and the A/V recording and communication device 130 may receive the signal 514 from the backend API 120. The signal 514 may include the adjusted motion alert range and/or the adjusted motion detection range. After receiving the signal 514 from the backend API 120, the A/V recording and communication device 130 may execute a command included in the signal 514 to apply new settings comprising the adjusted motion alert range and/or the adjusted motion detection range.

In one or more alternative embodiments, the user may be prompted to input a first value for setting a motion alert radius (first radius) and to input a second value for setting motion detection radius (second radius). The prompt(s) may ask the user to input a numerical value for each setting, with or without a diagram, such as the diagram 432 shown in the GUI 430 of FIGS. 17-19 and described above. In other alternative embodiments, the user may be prompted to input only a motion alert radius, and the motion detection radius may be automatically set to a maximum range of the motion detection sensors and/or the camera. In such embodiments, the motion detection radius may not be configurable by the user, but may instead be permanently set to the maximum range of the motion detection sensors and/or the camera.

In still further alternative embodiments, the user may be prompted simply to "opt in" to setting different thresholds for the A/V recording and communication device 130 detecting motion vs. providing an alert to the user. If the user opts in, the different thresholds for detecting motion vs. providing an alert to the user may be automatically set by the A/V recording and communication device 130. For example, the numerical values for the ranges for detecting motion vs. providing an alert to the user may not be configurable by the user, but may instead be automatically set. Then, if the user opts in, the A/V recording and communication device 130 operates with the different preset ranges for detecting motion vs. providing an alert to the user. Similarly, the configuration of the zones for detecting motion vs. providing an alert to the user may not be configurable by the user, but may instead be automatically set. Then, if the user opts in, the A/V recording and communication device 130 operates with the different preset ranges for detecting motion vs. providing an alert to the user.

After the motion sensitivity settings of the A/V recording and communication device 130 are changed, as described above, the user may then receive motion alerts consistent with the changed settings, and the A/V recording and communication device 130 may record audio and video footage consistent with the changed settings. For example, with reference to FIGS. 17 and 18, the user may set the motion alert range to the minimum distance (FIG. 17) and set the motion detection range to the maximum distance (FIG. 18). The user will then receive motion alerts only for detected motion that occurs within the active (dark) area 444 of the diagram 432 of FIG. 17. For any detected motion that occurs outside of the active area 444 of the diagram 432 of FIG. 17, but also within the active area 444 of the diagram 432 of FIG. 18, the A/V recording and communication device 130 will record audio and video footage for that motion, but the user will not receive a motion alert.

Figure 21:
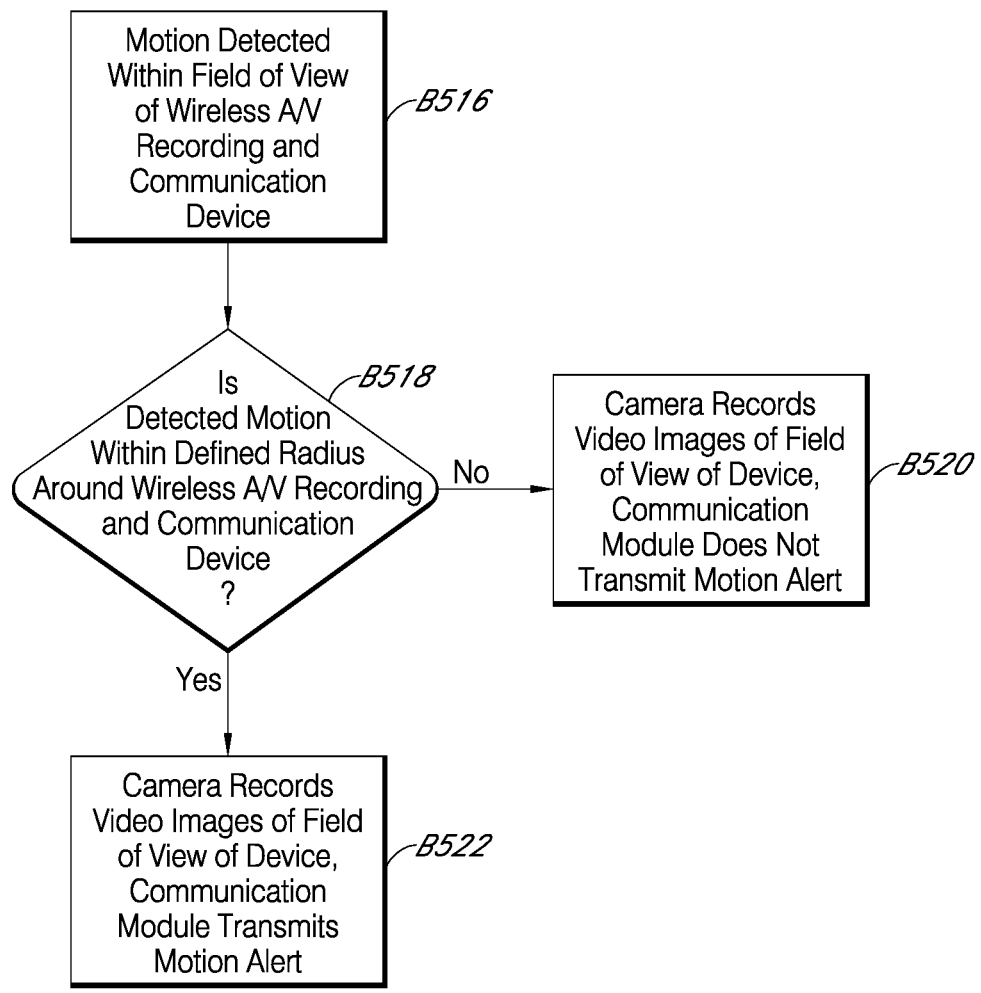
FIG. 21 is a flowchart illustrating another process according to an aspect of the present disclosure.

FIG. 21 is a flowchart that illustrates the foregoing process according to the present disclosure. At block B516, motion is detected within the field of view of the A/V recording and communication device 130. The process then moves to block B518, where it is determined whether the detected motion is within a defined radius around the A/V recording and communication device 130. The defined radius may correspond to the motion alert range described above. In some embodiments, the microcontroller 163 (FIG. 12) may make the determination of whether the detected motion is within the defined radius around the A/V recording and communication device 130. If it is determined at block B518 that the detected motion is not within the defined radius, then the process moves to block B520, where the camera 134 records video images of the field of view of the A/V recording and communication device 130, but the communication module 164 of the A/V recording and communication device 130 does not transmit a motion alert to the user (such as to the user's client device 114). If, however, it is determined at block B518 that the detected motion is within the defined radius, then the process moves to block B522, where the camera 134 records video images of the field of view of the A/V recording and communication device 130, and the communication module 164 of the A/V recording and communication device 130 transmits a motion alert to the user (such as to the user's client device 114).

Figure 21A:
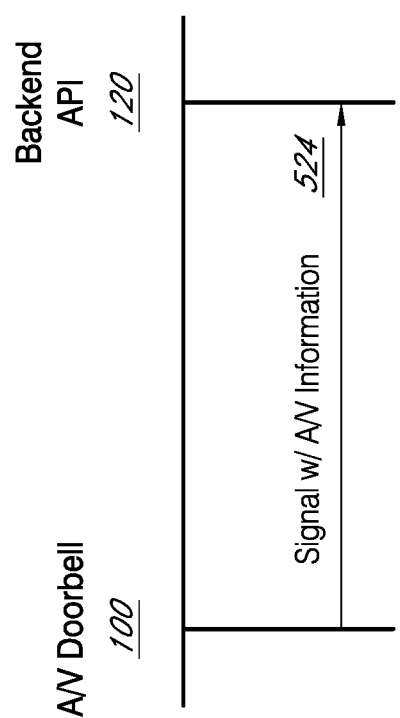
FIGS. 21A and 21B are sequence diagrams illustrating aspects of the process of FIG. 21.
Figure 21B:
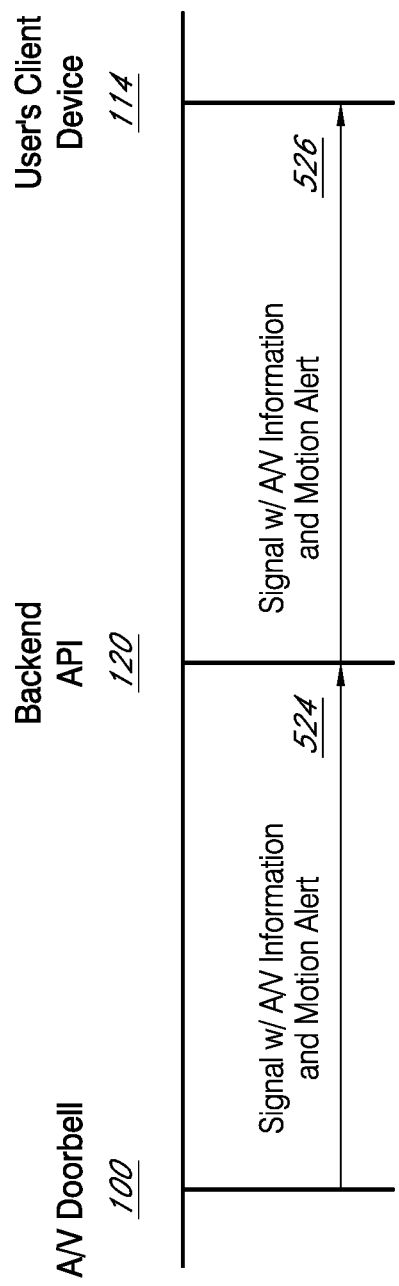

FIGS. 21A and 21B are sequence diagrams illustrating aspects of the process of FIG. 21. As described above with reference to FIG. 21, motion may be detected within the field of view of the A/V recording and communication device 130, and it may be determined whether the detected motion is within a defined radius around the A/V recording and communication device 130. If the detected motion is not within the defined radius around the A/V recording and communication device 130, then with reference to FIG. 21A the camera 134 records video images of the field of view of the A/V recording and communication device 130 and the A/V recording and communication device 130 sends a signal 524 to the backend API 120 with the A/V information recorded by the A/V recording and communication device 130, and the backend API 120 receives the signal 524 from the A/V recording and communication device 130. The backend API 120 may then process information in the received signal 524, and may store the A/V information and/or forward the A/V information to the storage device 116 for storing.

If, however, the detected motion is within the defined radius around the A/V recording and communication device 130, then with reference to FIG. 21B the camera 134 records video images of the field of view of the A/V recording and communication device 130 and the A/V recording and communication device 130 sends a signal 524 to the backend API 120 with the A/V information recorded by the A/V recording and communication device 130, and the backend API 120 receives the signal 524 from the A/V recording and communication device 130. The backend API 120 may then process information in the received signal 524, and may store the A/V information and/or forward the A/V information to the storage device 116 for storing. The backend API 120 also sends a signal 526 to the user's client device 114 with the A/V information (such as in the form of streaming audio and/or video) and a motion alert.

In some embodiments, the camera 134 of the A/V recording and communication device 130 may record video images of the field of view of the A/V recording and communication device 130 before motion is detected. For example, in some embodiments the camera 134 may continually record video images of the field of view of the A/V recording and communication device 130, regardless of whether motion has been detected or not. Thus, the processes described herein, including the process described above with reference to FIG. 21, are not limited to beginning recording of video images only after motion has been detected. However, in some embodiments motion detection may serve as a trigger for storing recorded video images for later retrieval and/or review. For example, while the camera 134 may continually record video images, those images may be stored for only a short time, such as in a rolling buffer. When motion is detected, the recorded video images within a window of time around the detected motion may be stored in a more permanent location, such as in non-volatile memory or storage (such as on a magnetic disc). Examples of A/V recording and communication devices in which the camera continually records video images are described in US Patent Application Ser. No. 62/308,746, filed on Mar. 15, 2016, and U.S. patent application Ser. Nos. 15/459,076 and 15/459,087, filed on Mar. 15, 2017, all of which are incorporated herein by reference in their entireties as if fully set forth.

Figure 22:
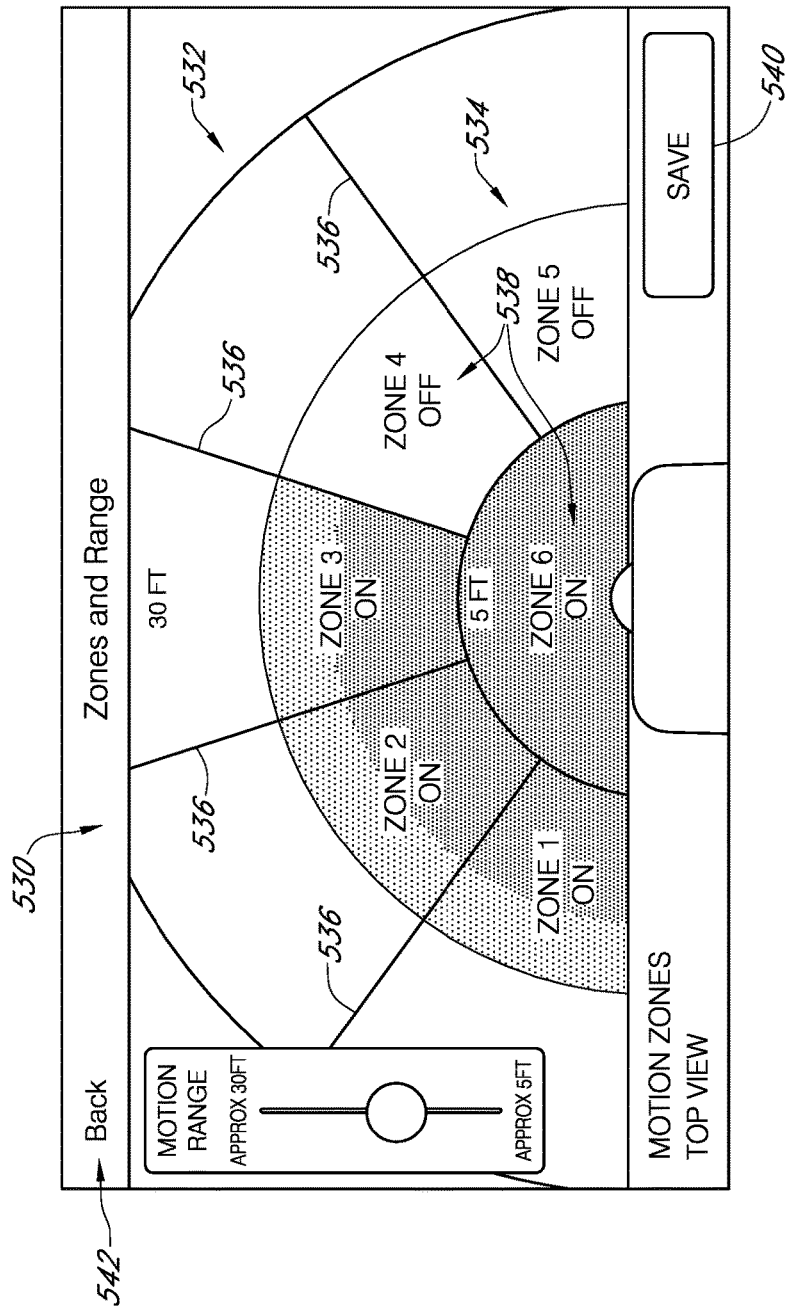
FIGS. 22-25 are screenshots of another graphical user interface for modifying settings of an A/V recording and communication device according to an aspect of the present disclosure.

As described above, in some embodiments a user may select (or toggle ON and OFF) one or more zones (areas of the field of view of the A/V recording and communication device 130) to be active or inactive for motion alerts ("motion alert zones"), and select (or toggle ON and OFF) one or more zones to be active or inactive for motion detection ("motion detection zones"). FIGS. 22-25 are screenshots of one example of a GUI 530 for selecting motion alert zones and motion detection zones (collectively "motion zones") or toggling motion zones ON or OFF according to an aspect of the present disclosure. In one example, the user may modify settings by selecting a menu choice from within a software application installed on the user's client device 114. With reference to FIG. 22, upon selecting the menu choice for modifying the motion zones settings of the A/V recording and communication device 130, the software application may display, on a display 806 (FIG. 30) of the user's client device 114, a diagram 532 of the field of view about the A/V recording and communication device 130. In the embodiment illustrated in FIG. 22, the diagram 532 is a top view, but in alternative embodiments the diagram 532 may be presented from a different perspective, such as a front view or a side view.

With reference to FIG. 22, the diagram 532 may indicate the motion zones 534 within the field of view, with each zone delineated by boundary lines 536 and enumerated with a unique zone identifier, such as a number (Zones 1-6). The zone diagram 532 further includes an ON/OFF indicator 538 for each motion zone 534, and includes contrasting colors for motion zones 534, such as a darker color for motion zones 534 that are ON (Zone 6) and a lighter color for motion zones 534 that are OFF (Zone 4). In the configuration of FIG. 22, Zones 1, 2, 3, and 6 are ON, while Zones 4 and 5 are OFF. The user may toggle selected ones of the motion zones 534 ON and OFF by individually selecting each zone 534. For example, if the display 806 of the user's client device 114 is a touchscreen, the user may toggle a selected motion zone 534 by touching that area of the touchscreen. In another example, the user may select motion zones 534 to toggle ON/OFF by clicking on those zones in the GUI 530 using a pointing device such as a mouse or a trackball. Motion alert zones 534 that are ON will trigger motion alerts when motion is detected in those zones 534, while no motion alerts will be triggered for any motion alert zones 534 that are OFF. Motion detection zones 534 that are ON will trigger motion detection when motion is detected in those zones, while no motion detection will be triggered for any motion detection zones 534 that are OFF.

Figure 23:
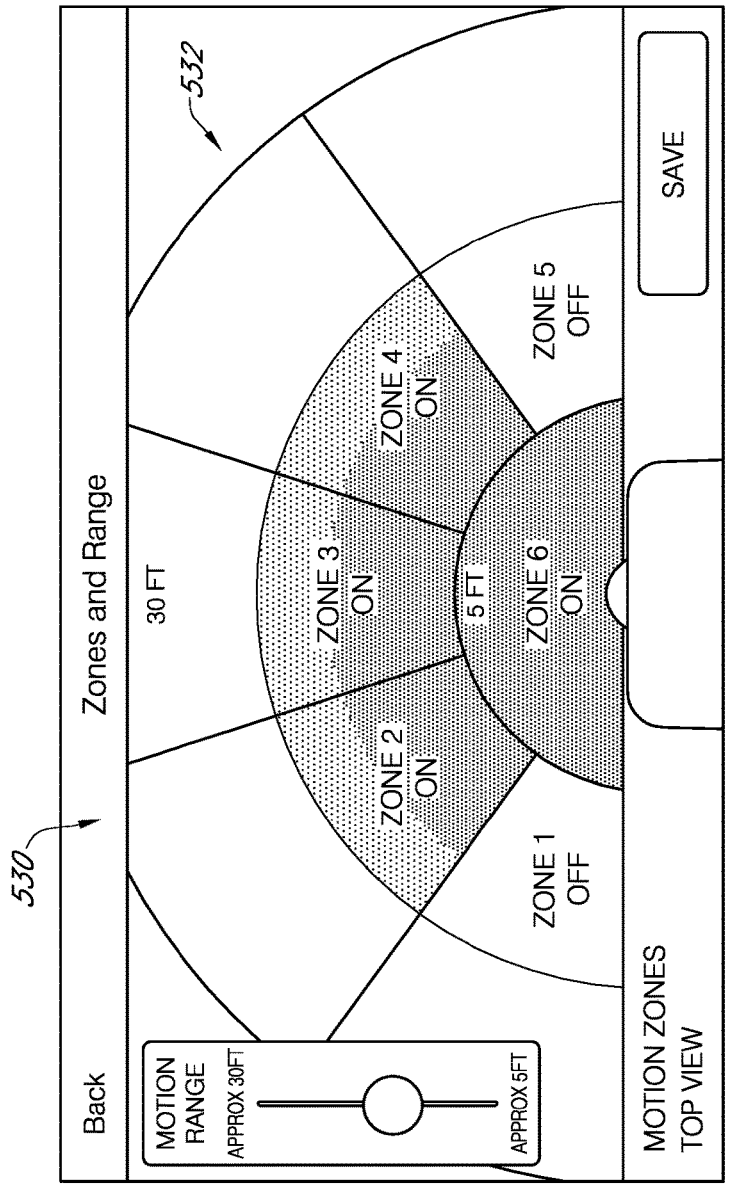

In certain of the present embodiments, the user may toggle individual motion zones 534 ON and OFF independently of the other motion zones 534, such that any combination of motion zones 534 may be ON at any given time. For example, FIGS. 22 and 23 illustrate some possible, and non-limiting, combinations. With reference to FIG. 22, Zones 1, 2, 3, and 6 are ON, while Zones 4 and 5 are OFF. With reference to FIG. 23, Zones 2, 3, 4, and 6 are ON, while Zones 1 and 5 are OFF. Other example combinations include, without limitation, Zones 2, 4, and 6 ON and Zones 1, 3, and 5 OFF; and Zones 1, 5, and 6 ON and Zones 2-4 OFF.

With further reference to FIG. 22, the current motion zone setting is indicated on the diagram 532 by contrasting colors or shades of the same color, with darker areas indicating motion zones 534 that are active or ON, where the A/V recording and communication device 130 will detect motion and/or trigger motion alerts, and lighter areas indicating motion zones 534 that are inactive or OFF, where the A/V recording and communication device 130 will not detect motion and/or not trigger motion alerts. In the present embodiments, the first motion zone setting (for motion alerts) and the second motion zone setting (for motion detection) may be set/adjusted on separate screens within the application executing on the user's client device 114, and each screen may include an indicator, such as text (not shown), that indicates to the user which setting is being adjusted on that screen. Alternatively, or in addition, the application executing on the user's client device 114 may show the user one or more prompts before each screen is displayed, or while each screen is displayed, on the client device 114, with each prompt indicating which setting will be adjusted on the next screen, or on the current screen.

With reference to FIG. 22, the GUI 530 further includes a SAVE button 540. When the user has set a desired motion zone configuration by toggling selected ones of the motion zones 534 ON and OFF, he or she may select the SAVE button 540 to update the motion zone configuration setting. The user may then close the zone diagram 532 by selecting the BACK button 542, which may return the user to a previous screen (not shown) within the software application.

Figure 24:
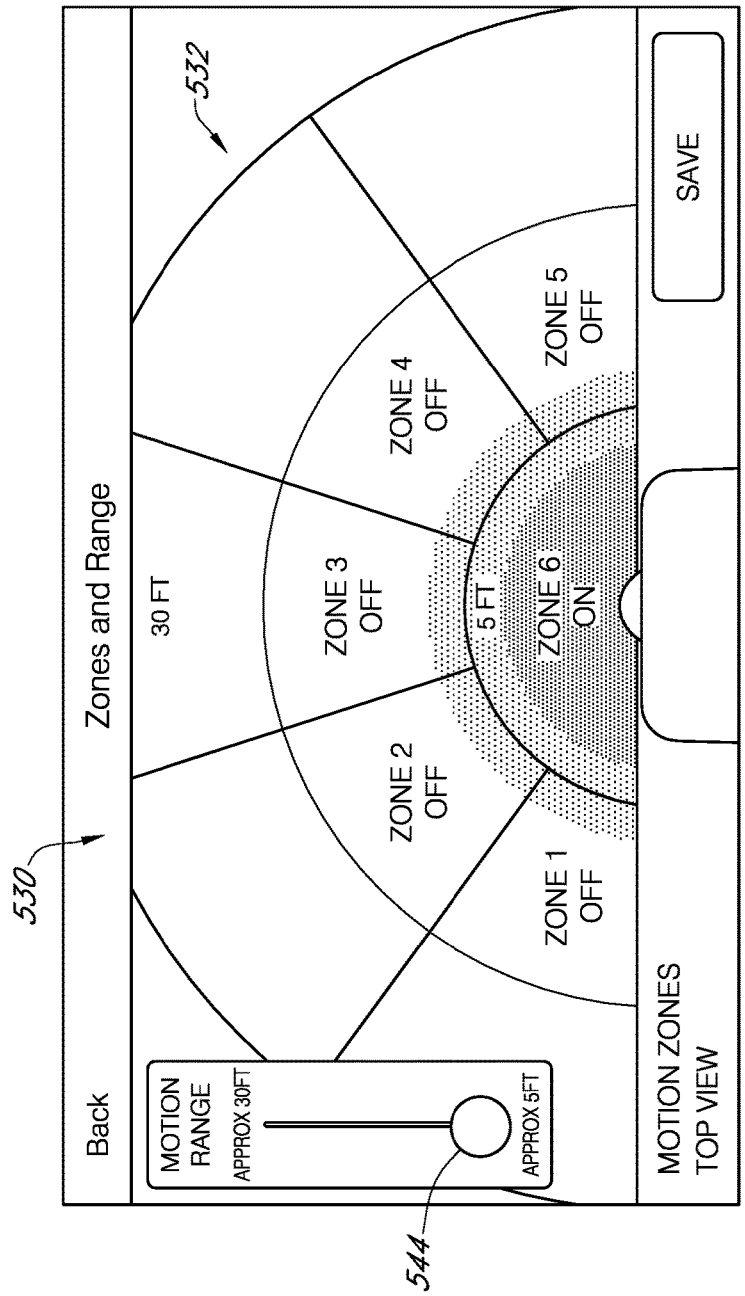
Figure 25:
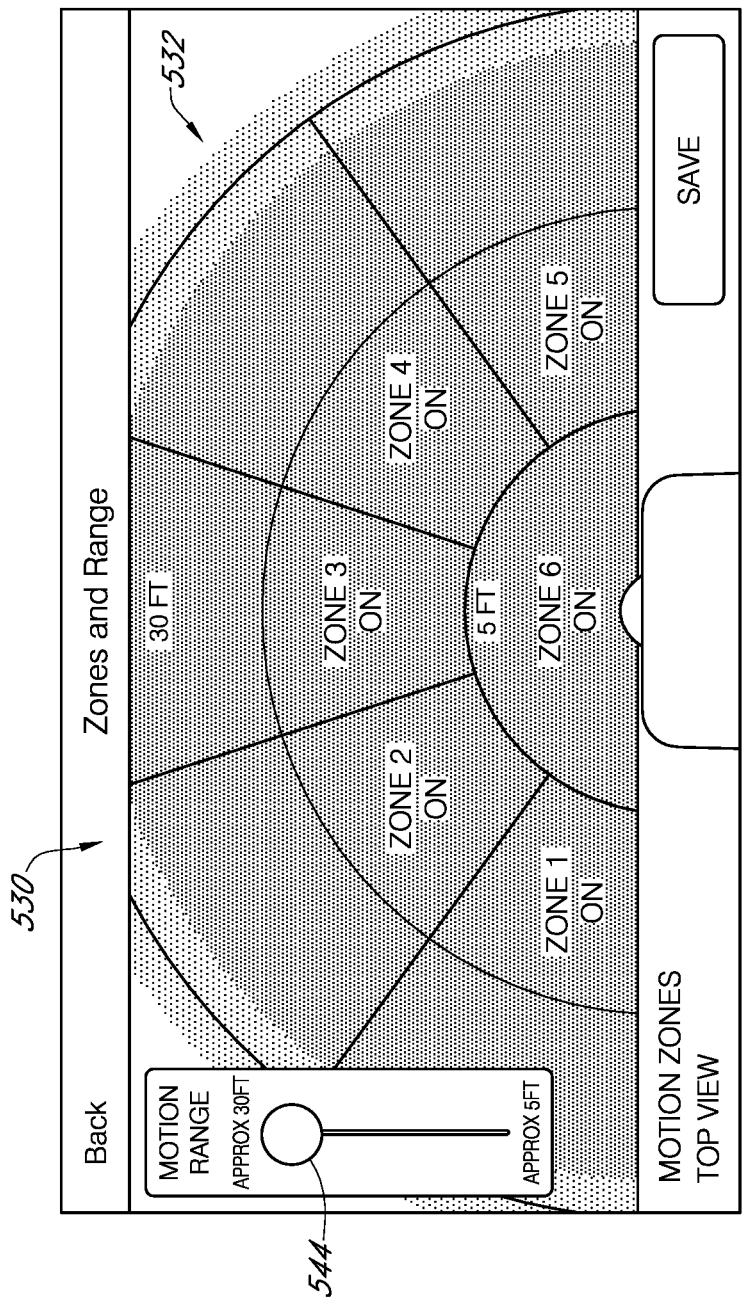

With reference to FIGS. 24 and 25, the motion range adjustment aspect described above with respect to FIGS. 17-19 may be combined with the motion zone configuration aspect described above with respect to FIGS. 22 and 23. For example, moving the slider widget 544 down may decrease the motion sensitivity range while also toggling motion zones 534 OFF (FIG. 24), and moving the slider widget 544 up may increase the motion sensitivity range while also toggling motion zones 534 ON (FIG. 25).

Figure 26:
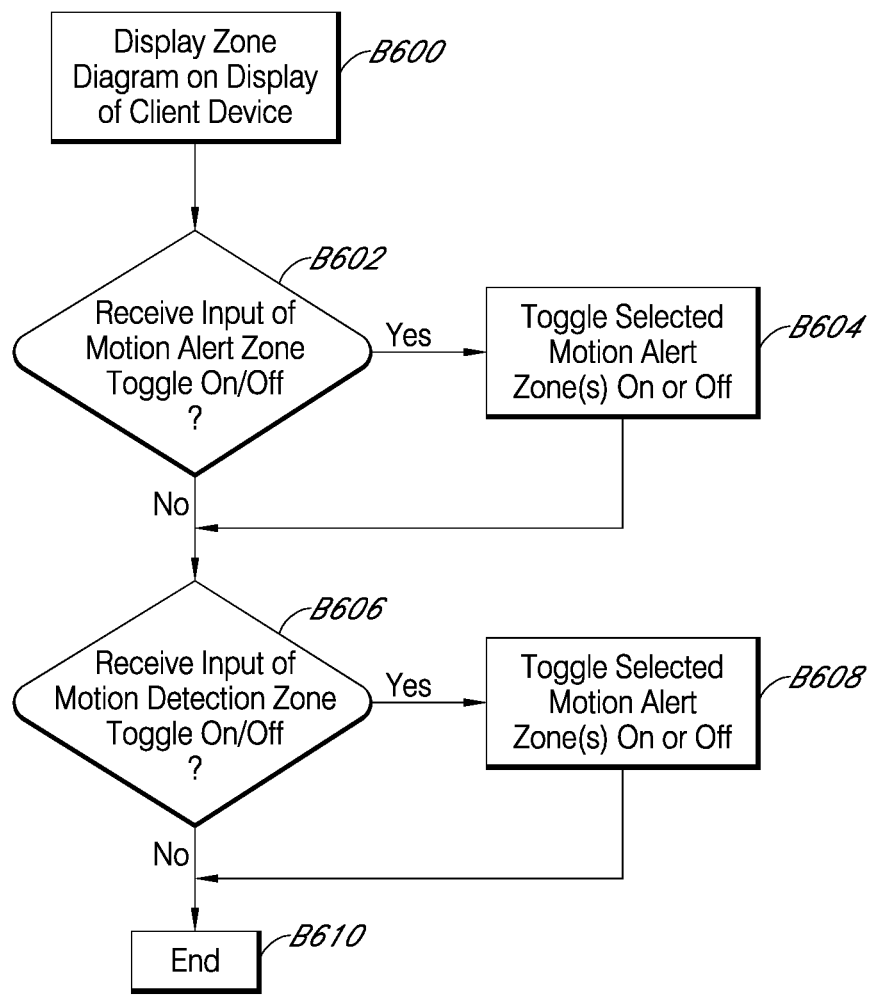
FIG. 26 is a flowchart illustrating another process according to an aspect of the present disclosure.

FIG. 26 is a flowchart illustrating an embodiment of a process according to the present disclosure. According to the process shown in FIG. 26, a user may remotely modify the motion zone configuration settings of an A/V recording and communication device, such as the A/V doorbell 100 (FIG. 1) or the A/V recording and communication device 130 (FIG. 2). At block B600, a diagram of the field of view about the A/V recording and communication device 130 is displayed on a display of the user's client device 114. The diagram may be the same as, or similar to, the diagram 532 described above with reference to FIGS. 22-25. The displaying of the diagram 532 on the display of the user's client device 114 may be performed by application software executing on the user's client device 114, for example.

With further reference to FIG. 26, at block B602 the process determines whether an input has been received to toggle ON or OFF a motion alert zone 534 of the A/V recording and communication device 130. The input may come from the user, for example by selecting one or more motion zones 534 on a motion alert zone adjustment screen displayed on the display 806 (FIG. 30), as described above with reference to FIGS. 22-25, followed by selecting the SAVE button 540. If an input is received to toggle ON or OFF a motion alert zone 534 of the A/V recording and communication device 130, then the process moves to block B604, where the selected motion alert zone(s) 534 of the A/V recording and communication device 130 is/are toggled ON or OFF and the changed setting is saved. If, however, no input is received to toggle ON or OFF a motion alert zone 534 of the A/V recording and communication device 130, then the process moves to block B606.

At block B606, the process determines whether an input has been received to toggle ON or OFF a motion detection zone 534 of the A/V recording and communication device 130. The input may come from the user, for example by selecting one or more motion zones 534 on a motion detection zone adjustment screen displayed on the display 806 (FIG. 30), as described above with reference to FIGS. 22-25, followed by selecting the SAVE button 540. If an input is received to toggle ON or OFF a motion detection zone 534 of the A/V recording and communication device 130, then the process moves to block B608, where the selected motion detection zone(s) 534 of the A/V recording and communication device 130 is/are toggled ON or OFF and the changed setting is saved. The process then ends at block B610. If, however, no input is received to toggle ON or OFF a motion detection zone 534 of the A/V recording and communication device 130, then the process ends at block B610.

In certain embodiments, saving any changed settings may further comprise sending the changed settings to a network and/or a network device (such as the network 112, the server 118, and/or the backend API 120 of FIG. 1), from which the A/V recording and communication device 130 may subsequently download the changed settings. For example, to implement the new motion zone settings in the A/V recording and communication device 130, the backend API 120 may communicate with the A/V recording and communication device 130. In the process of the communication, the backend API 120 may provide the updated user settings and instruct the A/V recording and communication device 130 to overwrite any previous settings.

Figure 26A:
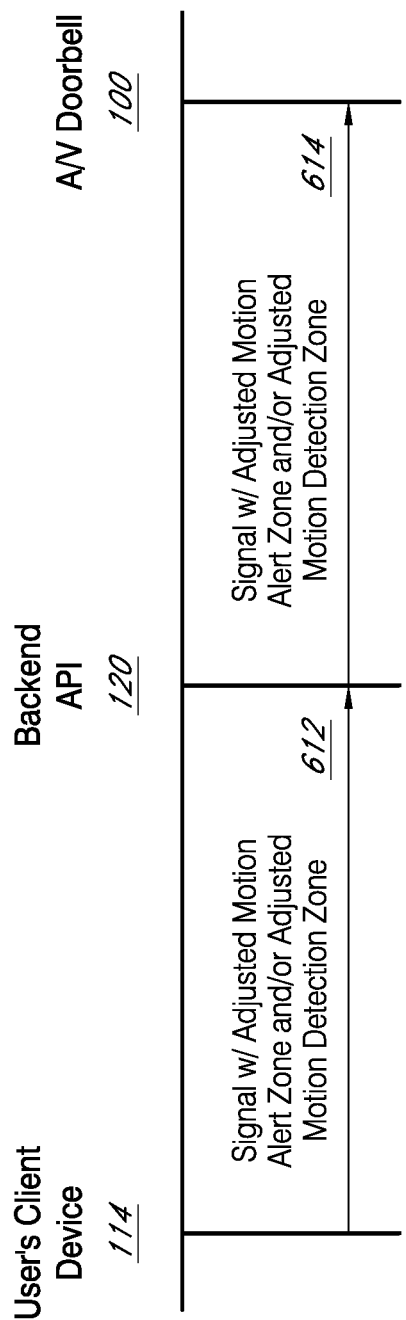
FIG. 26A is a sequence diagram illustrating an aspect of the process of FIG. 26.

FIG. 26A is a sequence diagram illustrating an aspect of the process of FIG. 26. As described above with reference to FIG. 26, one or more user inputs may be received to adjust (toggle ON or OFF) one or more motion alert zones 534 of the A/V recording and communication device 130 and/or to adjust (toggle ON or OFF) one or more motion detection zones 534 of the A/V recording and communication device 130. With reference to FIG. 26A, after the input(s) are received at the user's client device 114, the user's client device 114 may send a signal 612 to the backend API 120, and the backend API 120 may receive the signal 612 from the user's client device 114. The signal 612 may include the adjusted motion alert zone(s) 534 and/or the adjusted motion detection zone(s) 534. After receiving the signal 612 from the user's client device 114, the backend API 120 may send a signal 614 to the A/V recording and communication device 130, and the A/V recording and communication device 130 may receive the signal 614 from the backend API 120. The signal 614 may include the adjusted motion alert zone(s) 534 and/or the adjusted motion detection zone(s) 534. After receiving the signal 614 from the backend API 120, the A/V recording and communication device 130 may execute a command included in the signal 614 to apply new settings comprising the adjusted motion alert zone(s) 534 and/or the adjusted motion detection zone(s) 534.

After the motion zone settings of the A/V recording and communication device 130 are changed, as described above, the user may then receive motion alerts consistent with the changed settings, and the A/V recording and communication device 130 may record audio and video footage consistent with the changed settings. For example, with reference to FIGS. 22 and 23, the user may set the motion zones 1, 2, 3, and 6 (FIG. 22) to be active for motion alerts, and the user may set the motion zones 2, 3, 4, and 6 (FIG. 23) to be active for motion detection. The user will then receive motion alerts only for detected motion that occurs within the zone(s) 534 that are active for motion alerts. Thus, with the settings as described above for FIGS. 22 and 23, for any detected motion that occurs Zone 4 the A/V recording and communication device 130 will record audio and video footage for that motion, but the user will not receive a motion alert.

Figure 27:
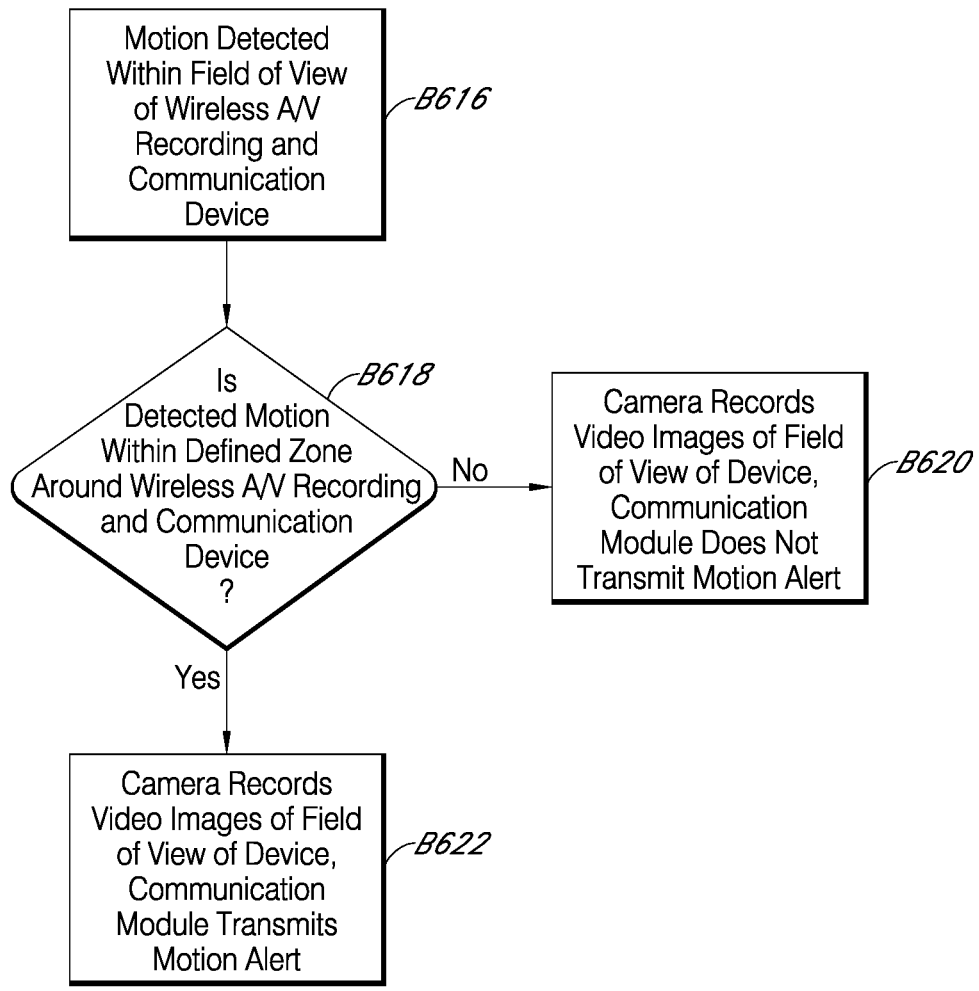
FIG. 27 is a flowchart illustrating another process according to an aspect of the present disclosure.

FIG. 27 is a flowchart that illustrates the foregoing process according to the present disclosure. At block B616, motion is detected within the field of view of the A/V recording and communication device 130. The process then moves to block B618, where it is determined whether the detected motion is within a defined zone around the A/V recording and communication device 130. The defined zone may correspond to an active motion alert zone 534, as described above with reference to FIGS. 22-25. In some embodiments, the microcontroller 163 (FIG. 12) may make the determination of whether the detected motion is within a defined zone around the A/V recording and communication device 130. If it is determined at block B618 that the detected motion is not within a defined zone, then the process moves to block B620, where the camera 134 records video images of the field of view of the A/V recording and communication device 130, but the communication module 164 of the A/V recording and communication device 130 does not transmit a motion alert to the user (such as to the user's client device 114). If, however, it is determined at block B618 that the detected motion is within a defined zone, then the process moves to block B622, where the camera 134 records video images of the field of view of the A/V recording and communication device 130, and the communication module 164 of the A/V recording and communication device 130 transmits a motion alert to the user (such as to the user's client device 114).

Figure 27A:
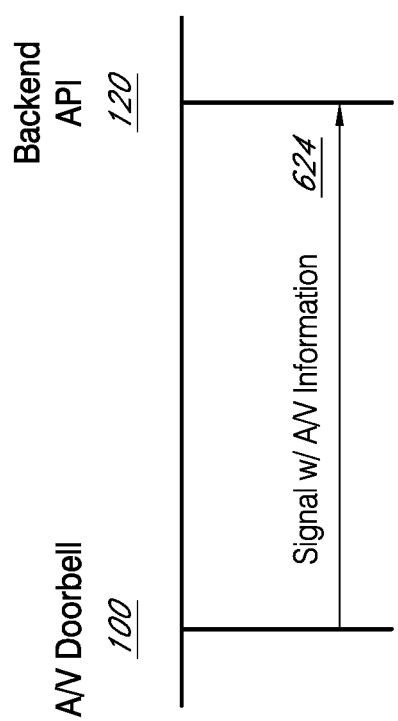
FIGS. 27A and 27B are sequence diagrams illustrating aspects of the process of FIG. 27.
Figure 27B:
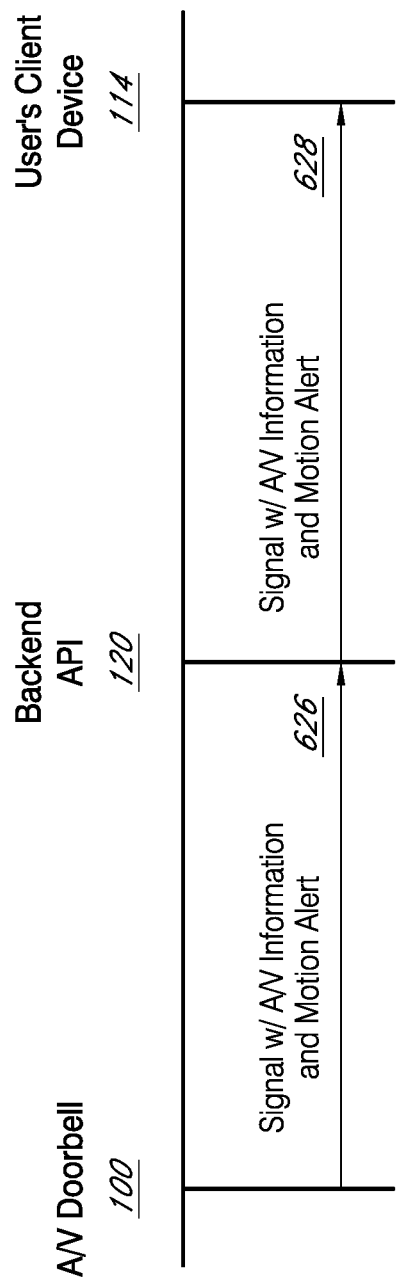

FIGS. 27A and 27B are sequence diagrams illustrating aspects of the process of FIG. 27. As described above with reference to FIG. 27, motion may be detected within the field of view of the A/V recording and communication device 130, and it may be determined whether the detected motion is within a defined zone around the A/V recording and communication device 130. If the detected motion is not within the defined zone around the A/V recording and communication device 130, then with reference to FIG. 27A the camera 134 records video images of the field of view of the A/V recording and communication device 130 and the A/V recording and communication device 130 sends a signal 624 to the backend API 120 with the A/V information recorded by the A/V recording and communication device 130, and the backend API 120 receives the signal 624 from the A/V recording and communication device 130. The backend API 120 may then process information in the received signal 624, and may store the A/V information and/or forward the A/V information to the storage device 116 for storing.

If, however, the detected motion is within the defined zone around the A/V recording and communication device 130, then with reference to FIG. 27B the camera 134 records video images of the field of view of the A/V recording and communication device 130 and the A/V recording and communication device 130 sends a signal 626 to the backend API 120 with the A/V information recorded by the A/V recording and communication device 130 and a motion alert, and the backend API 120 receives the signal 626 from the A/V recording and communication device 130. The backend API 120 may then process information in the received signal 626, and may store the A/V information and/or forward the A/V information to the storage device 116 for storing. The backend API 120 also sends a signal 628 to the user's client device 114 with the A/V information (such as in the form of streaming audio and/or video) and a motion alert.

In some embodiments, the camera 134 of the A/V recording and communication device 130 may record video images of the field of view of the A/V recording and communication device 130 before motion is detected. For example, in some embodiments the camera 134 may continually record video images of the field of view of the A/V recording and communication device 130, regardless of whether motion has been detected or not. Thus, the processes described herein, including the process described above with reference to FIG. 27, are not limited to beginning recording of video images only after motion has been detected. However, in some embodiments motion detection may serve as a trigger for storing recorded video images for later retrieval and/or review. For example, while the camera 134 may continually record video images, those images may be stored for only a short time, such as in a rolling buffer. When motion is detected, the recorded video images within a window of time around the detected motion may be stored in a more permanent location, such as in non-volatile memory or storage (such as on a magnetic disc). Examples of A/V recording and communication devices in which the camera continually records video images are described in U.S. Patent Application Ser. No. 62/308,746, filed on Mar. 15, 2016, and U.S. patent application Ser. Nos. 15/459,076 and 15/459,087, filed on Mar. 15, 2017, all of which are incorporated herein by reference in their entireties as if fully set forth.

In some embodiments, a process for selecting or designating motion zones 534 may present the user with a visual representation of the field of view of the camera. For example, an application executing on the user's client device 114, 800 (FIG. 30), such as a smartphone, may show a live view from the camera of the user's A/V recording and communication device on the display 806 of the user's client device 800. The process may prompt the user to designate one or more motion zones 534 by selecting areas on the display 806 of the user's client device 800. For example, the user may draw one or more polygons on the display 806 to designate the motion zone(s) 534. If the display 806 of the user's client device 800 is a touchscreen, the user may designate the motion zone(s) 534 by tracing the polygon(s) on the display 806 with his or her finger. The process may enable the user to designate motion zone(s) 534 having any shape and/or number of sides. For example, the motion zone(s) 534 may be regular polygons or any type of irregular polygons. The process may allow the user to designate any number of motion zones 534, such as one motion zone 534, two motion zones 534, three motion zones 534, etc. When all desired motion zones 534 have been created, the process may prompt the user to save the motion zones 534, after which the created motion zones 534 may be sent from the user's client device 800 to a device in the network, such as the backend API 120 (FIG. 1) or a server 900C (FIG. 31), and to the user's A/V recording and communication device 130 via the user's wireless network 110 (FIG. 1). Further examples of selecting or designating motion zones 534 using a live view from the camera of the user's A/V recording and communication device are described in U.S. Patent Application Ser. No. 62/308,746, filed on Mar. 15, 2016, and U.S. patent application Ser. Nos. 15/459,076 and 15/459,087, filed on Mar. 15, 2017, all of which are incorporated herein by reference in their entireties as if fully set forth.

Figure 28:
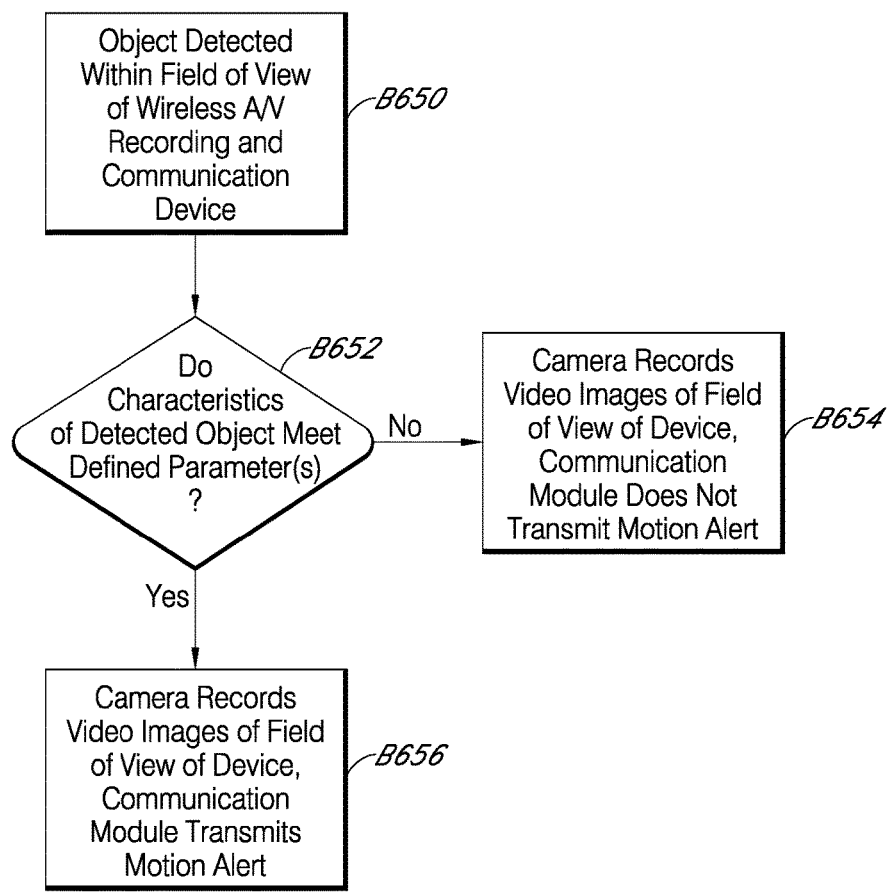
FIGS. 28-29 are flowcharts illustrating processes according to aspects of the present disclosure.

FIG. 28 is a flowchart that illustrates another process according to the present disclosure. At block B650, an object is detected within the field of view of the A/V recording and communication device 130. The process then moves to block B652, where it is determined whether the characteristics of the detected object meet one or more defined parameters. In some embodiments, the defined parameter(s) may comprise, for example, a size of the detected object. For example, if the size of the detected object is above a threshold, then the defined parameter(s) may be met, and if the size of the detected object is below the threshold, then the defined parameter(s) may not be met. In some embodiments, the microcontroller 163 (FIG. 12) may make the determination of whether the characteristics of the detected object meet the defined parameter(s). If it is determined at block B652 that the characteristics of the detected object do not meet the defined parameter(s), then the process moves to block B654, where the camera 134 records video images of the field of view of the A/V recording and communication device 130, but the communication module 164 of the A/V recording and communication device 130 does not transmit a motion alert to the user (such as to the user's client device 114). If, however, it is determined at block B652 that the characteristics of the detected object meet the defined parameter(s), then the process moves to block B656, where the camera 134 records video images of the field of view of the A/V recording and communication device 130, and the communication module 164 of the A/V recording and communication device 130 transmits a motion alert to the user (such as to the user's client device 114).

Figure 29:
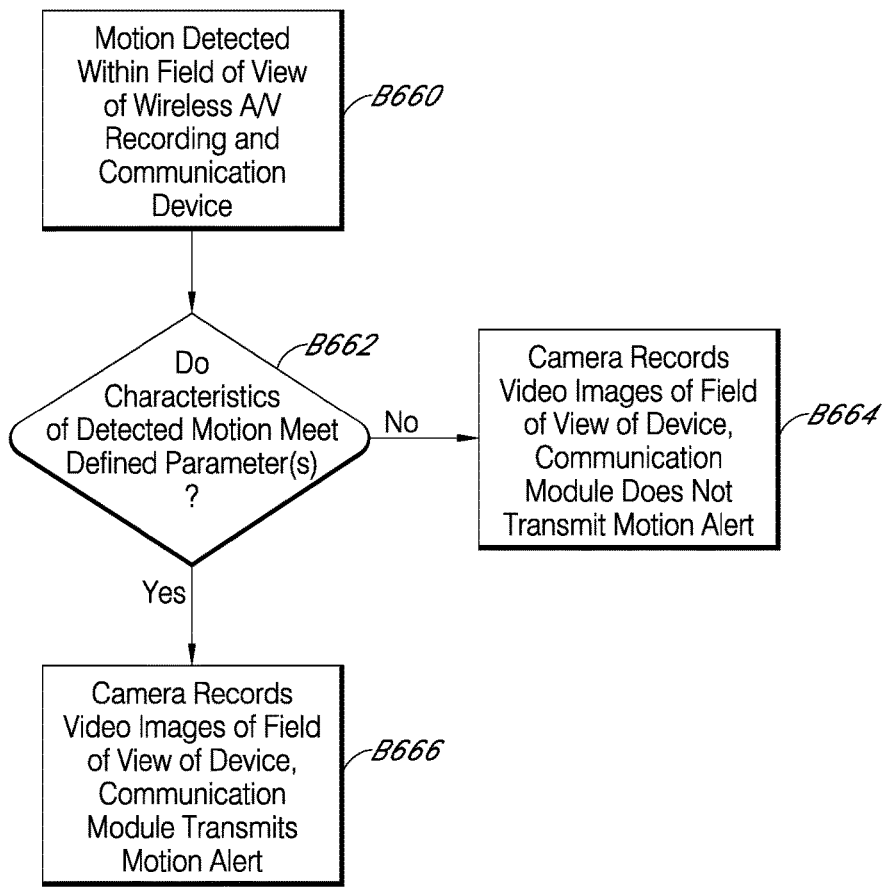

FIG. 29 is a flowchart that illustrates another process according to the present disclosure. At block B660, motion is detected within the field of view of the A/V recording and communication device 130. The process then moves to block B662, where it is determined whether the characteristics of the detected motion meet one or more defined parameters. In some embodiments, the defined parameter(s) may comprise, for example, a magnitude of the detected motion. For example, if the magnitude of the detected motion is above a threshold, then the defined parameter(s) may be met, and if the magnitude of the detected motion is below the threshold, then the defined parameter(s) may not be met. In some embodiments, the microcontroller 163 (FIG. 12) may make the determination of whether the characteristics of the detected motion meet the defined parameter(s). If it is determined at block B662 that the characteristics of the detected motion do not meet the defined parameter(s), then the process moves to block B664, where the camera 134 records video images of the field of view of the A/V recording and communication device 130, but the communication module 164 of the A/V recording and communication device 130 does not transmit a motion alert to the user (such as to the user's client device 114). If, however, it is determined at block B662 that the characteristics of the detected motion meet the defined parameter(s), then the process moves to block B666, where the camera 134 records video images of the field of view of the A/V recording and communication device 130, and the communication module 164 of the A/V recording and communication device 130 transmits a motion alert to the user (such as to the user's client device 114).

As described above, the present embodiments advantageously enable audio and/or video footage to be recorded by an A/V recording and communication device without generating a motion alert for the user. The recorded footage can subsequently be shared with law enforcement to aid in the identification, apprehension, and prosecution of criminal perpetrators. Example systems and methods for sharing video footage from A/V recording and communication devices with law enforcement are described in U.S. Patent Application Ser. No. 62/270,373 filed on Dec. 21, 2015, U.S. Patent Application Ser. No. 62/271,186 filed on Dec. 22, 2015, U.S. Patent Application Ser. No. 62/288,971 filed on Jan. 29, 2016, and U.S. patent application Ser. Nos. 15/387,444 and 15/387,471, filed on Dec. 21, 2016, all of which are incorporated herein by reference in their entireties as if fully set forth.

The present disclosure describes several embodiments with reference to the A/V recording and communication doorbell 130 illustrated in FIGS. 2-12. The doorbell 130 includes the passive infrared sensors 144, which are used to detect motion. The present embodiments, however, are not limited to the A/V recording and communication doorbell 130, nor are the present embodiments limited to detecting motion with passive IR sensors. The present embodiments are applicable to all types of A/V recording and communication devices. For example, the present embodiments are applicable to A/V recording and communication devices that use a camera for motion detection. Examples of A/V recording and communication devices in which the camera is used for motion detection are described in US Patent Application Ser. No. 62/308,746, filed on Mar. 15, 2016, and U.S. patent application Ser. Nos. 15/459,076 and 15/459,087, filed on Mar. 15, 2017, all of which are incorporated herein by reference in their entireties as if fully set forth.

Figure 30:
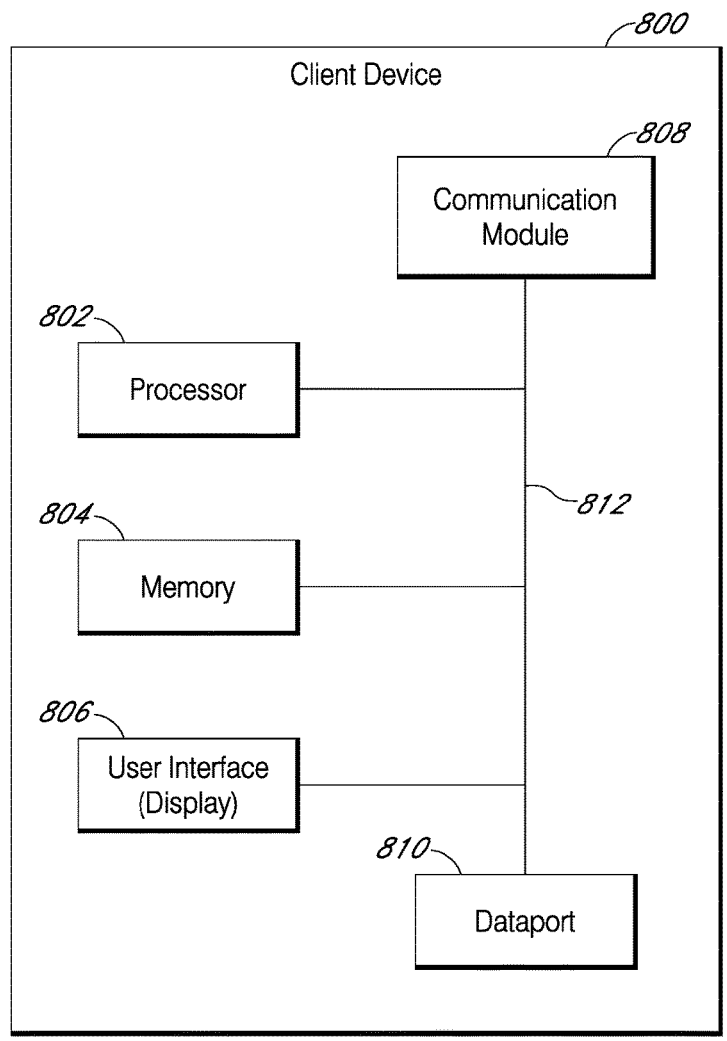
FIG. 30 is a functional block diagram of a client device on which the present embodiments may be implemented according to various aspects of the present disclosure.

FIG. 30 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 30, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 31:
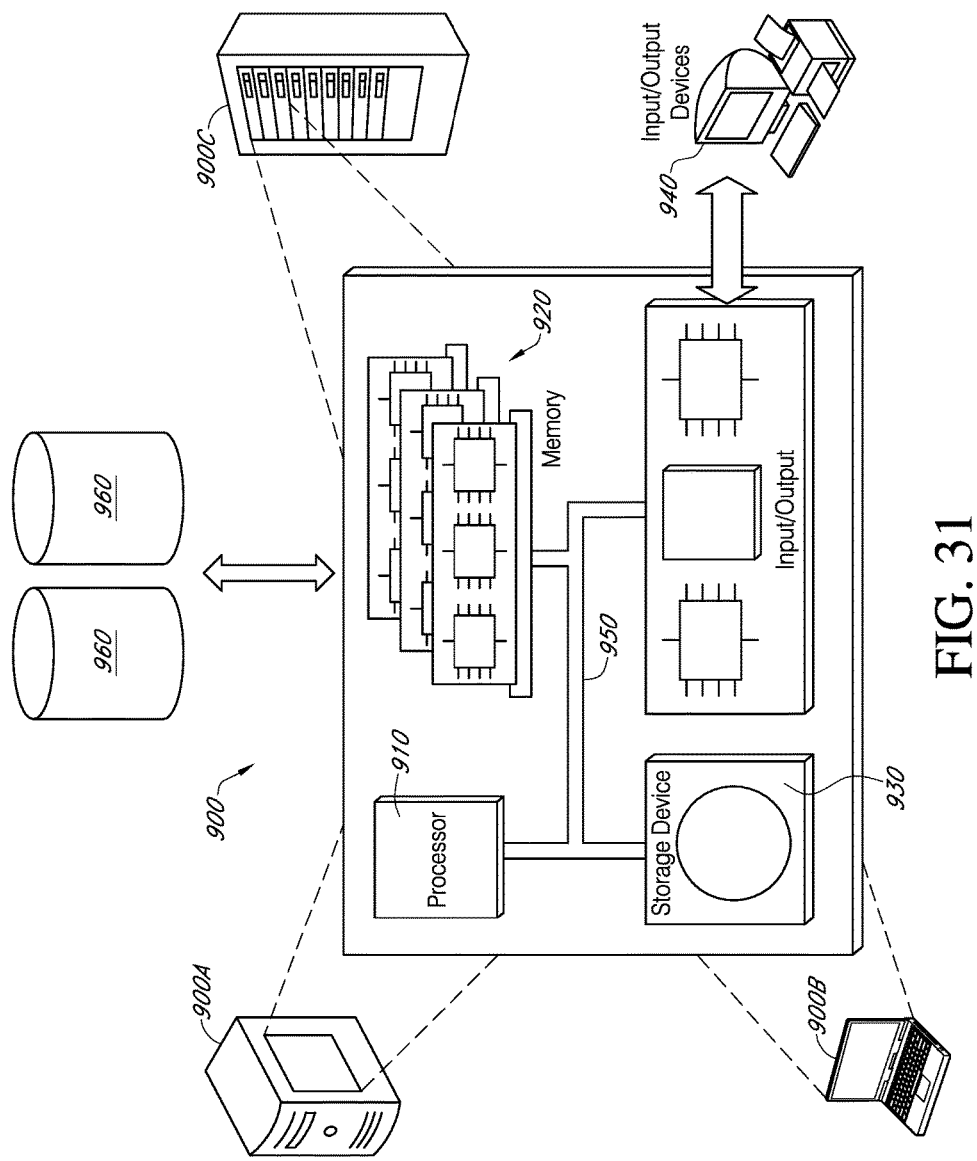
FIG. 31 is a functional block diagram of a general-purpose computing system on which the present embodiments may be implemented according to various aspects of present disclosure.

FIG. 31 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A computer-implemented method for an audio/video (A/V) recording and communication device, the method comprising:
    displaying, on a display of a computing device, a diagram of a field of view about the A/V recording and communication device;
    determining whether an input has been received to adjust a motion alert range of the A/V recording and communication device;
    when an input has been received to adjust the motion alert range of the A/V recording and communication device, increasing or decreasing the motion alert range of the A/V recording and communication device;
    determining whether an input has been received to adjust a motion detection range of the A/V recording and communication device;
    when an input has been received to adjust the motion detection range of the A/V recording and communication device, increasing or decreasing the motion detection range of the A/V recording and communication device;
    determining whether an input has been received to save any changed settings; and
    when an input has been received to save any changed settings, saving the changed settings.

2. The method of claim 1, wherein the A/V recording and communication device includes a set of motion sensors.

3. The method of claim 2, wherein the diagram comprises a set of motion zones, and wherein each of the motion zones corresponds to an area of a field of view of at least one of the set of motion sensors.

4. The method of claim 1, wherein determining whether an input has been received to adjust the motion alert range or the motion detection range of the A/V recording and communication device comprises detecting movement of a slider widget on the display of the computing device.

5. The method of claim 1 further comprising indicating a current setting of the motion alert range of the A/V recording and communication device with contrasting colors or shades of the same color on the display of the computing device.

6. The method of claim 5, wherein a darker area indicates an area where the A/V recording and communication device will generate a motion alert, and a lighter area indicates an area where the A/V recording and communication device will not generate a motion alert.

7. The method of claim 1 further comprising indicating a current setting of the motion detection range of the A/V recording and communication device with contrasting colors or shades of the same color on the display of the computing device.

8. The method of claim 7, wherein a darker area indicates an area where the A/V recording and communication device will detect motion, and a lighter area indicates an area where the A/V recording and communication device will not detect motion.

9. A non-transitory machine readable medium of an electronic device storing an application executable by at least one processing unit of the electronic device, the application comprising sets of instructions for:
    displaying, on a display of a computing device, a diagram of a field of view about the A/V recording and communication device;
    determining whether an input has been received to toggle on or off a motion alert zone of the A/V recording and communication device;
    when an input has been received to toggle on or off a motion alert zone of the A/V recording and communication device, toggling on or off a selected motion alert zone of the A/V recording and communication device;
    determining whether an input has been received to toggle on or off a motion detection zone of the A/V recording and communication device;
    when an input has been received to toggle on or off a motion detection zone of the A/V recording and communication device, toggling on or off a selected motion detection zone of the A/V recording and communication device;
    determining whether an input has been received to save any changed settings; and when an input has been received to save any changed settings, saving the changed settings.

10. The non-transitory machine readable medium of claim 9, wherein the A/V recording and communication device includes at least one motion sensor.

11. The non-transitory machine readable medium of claim 10, wherein the diagram comprises at least one motion zone that corresponds to an area of a field of view of the at least one motion sensor.

12. The non-transitory machine readable medium of claim 9, wherein the set of instructions for determining whether an input has been received to toggle on or off the motion alert zone of the A/V recording and communication device comprises a set of instructions for detecting a selection of the motion alert zone on the display of the computing device.

13. The non-transitory machine readable of claim 9, wherein the set of instructions for determining whether an input has been received to toggle on or off the motion detection zone of the A/V recording and communication device comprises a set of instructions for detecting a selection of the motion detection zone on the display of the computing device.

14. The non-transitory machine readable of claim 9, wherein the application further comprises a set of instructions for indicating current settings of a plurality of motion alert zones of the A/V recording and communication device with contrasting colors or shades of the same color on the display of the computing device.

15. The non-transitory machine readable of claim 14, wherein darker areas indicate motion alert zones where the A/V recording and communication device will generate a motion alert, and lighter areas indicate motion alert zones where the A/V recording and communication device will not generate a motion alert.

16. The non-transitory machine readable of claim 9, wherein the application further comprises a set of instructions for indicating current settings of a plurality of motion detection zones of the A/V recording and communication device with contrasting colors or shades of the same color on the display of the computing device.

17. The non-transitory machine readable of claim 16, wherein darker areas indicate motion detection zones where the A/V recording and communication device will detect motion, and lighter areas indicate motion detection zones where the A/V recording and communication device will not detect motion.

18. A method for an audio/video (A/V) recording and communication device, the A/V recording and communication device including a camera, a processor, and a communication module, the method comprising:
    detecting motion within a field of view of the camera of the A/V recording and communication device;
    recording video images captured within the field of view of the camera of the A/V recording and communication device;
    determining, at the processor, whether the detected motion is within a defined radius around the A/V recording and communication device; and
    when the detected motion is within the defined radius around the A/V recording and communication device, transmitting, by the communication module, a motion alert to at least one client device.

19. The method of claim 18 further comprising, before determining whether the detected motion is within the defined radius, transmitting, by the communication module, the recorded video images to the at least one client device.

20. The method of claim 18 further comprising, when the detected motion is outside the defined radius around the A/V recording and communication device, forgoing transmitting, by the communication module, the motion alert to the at least one client device.

21. The method of claim 18, wherein the radius around the A/V recording and communication device is defined by a user through a client device associated with the A/V recording and communication device.

22. The method of claim 18, wherein the device comprises a plurality of motion sensors, and wherein the defined radius comprises a plurality of motion zones each of which corresponds to an area of a field of view of at least one of the plurality of motion sensors.

* * * * *